(12) United States Patent
Saini et al.

(10) Patent No.: US 11,806,954 B2
(45) Date of Patent: Nov. 7, 2023

(54) WRINKLE MITIGATION IN CONTOURED COMPOSITE STIFFENERS

(71) Applicant: The Boeing Company, Chicago, IL (US)

(72) Inventors: Gagandeep Saini, Snohomish, WA (US); Ian Edward Schroeder, Seattle, WA (US); Kurtis Shuldberg Willden, Kent, WA (US); Lisa Christina Carlson, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/644,285

(22) Filed: Dec. 14, 2021

(65) Prior Publication Data
US 2023/0182417 A1 Jun. 15, 2023

(51) Int. Cl.
| | | |
|---|---|---|
| B29C 70/54 | (2006.01) | |
| B29D 99/00 | (2010.01) | |
| B29C 70/46 | (2006.01) | |
| B29L 9/00 | (2006.01) | |
| B29L 31/00 | (2006.01) | |

(52) U.S. Cl.
CPC ........... *B29C 70/549* (2021.05); *B29C 70/462* (2013.01); *B29D 99/0003* (2013.01); *B29L 2009/00* (2013.01); *B29L 2031/001* (2013.01)

(58) Field of Classification Search
None
See application file for complete search history.

(56) References Cited

U.S. PATENT DOCUMENTS

| | | | |
|---|---|---|---|
| 8,465,613 B2 | 6/2013 | Rotter et al. | |
| 8,997,642 B2 | 4/2015 | Stewart et al. | |
| 9,162,396 B2 | 10/2015 | Coxon et al. | |
| 9,272,767 B2 | 3/2016 | Stewart | |
| 9,387,628 B2 | 7/2016 | Chapman et al. | |
| 9,782,960 B1 | 10/2017 | Robins et al. | |
| 10,315,750 B2 | 6/2019 | Stewart | |
| 10,369,740 B2 | 8/2019 | Chapman et al. | |
| 10,399,283 B2 | 9/2019 | Offensend et al. | |
| 2014/0314996 A1 | 10/2014 | Stewart | |
| 2015/0044430 A1 | 2/2015 | Lee et al. | |
| 2016/0023409 A1 | 1/2016 | Coxon et al. | |
| 2020/0254702 A1* | 8/2020 | Saini | B29C 70/443 |
| 2021/0107238 A1 | 4/2021 | Saini et al. | |
| 2021/0107239 A1 | 4/2021 | Saini et al. | |

FOREIGN PATENT DOCUMENTS

| | | | |
|---|---|---|---|
| EP | 3693155 A1 | 8/2020 | |
| EP | 3970938 A1 | 3/2022 | |
| EP | 3970955 A1 | 3/2022 | |

OTHER PUBLICATIONS

European Patent Office Extended Search Report, dated May 16, 2023, regarding Application No. EP22193086.0, 7 pages.
Plummer et al., "Constrained Forming of Contoured Composite Hat Stringers," U.S. Appl. No. 17/447,593, filed Sep. 14, 2021, 31 pages.
Plummer et al., "Net Shape Forming of Composite Stringers Containing Out-Of-Plane Features," U.S. Appl. No. 17/447,595, filed Sep. 14, 2021, 37 pages.
Plummer et al., "Tool and Method for Forming Contoured Composite Stringers Having Reduced Wrinkling," U.S. Appl. No. 17/447,591, filed Sep. 14, 2021, 38 pages.

* cited by examiner

*Primary Examiner* — Barbara J Musser
(74) *Attorney, Agent, or Firm* — Yee & Associates, P.C.

(57) ABSTRACT

A composite charge is formed between two compression dies into a composite laminate stiffener. The stiffener is contoured along its length by contouring the dies. Wrinkle diffusers attached to, or embedded or incorporated into the tool surfaces of the dies, diffuse wrinkles formed on the inside radius of the stiffener during the contouring.

20 Claims, 23 Drawing Sheets

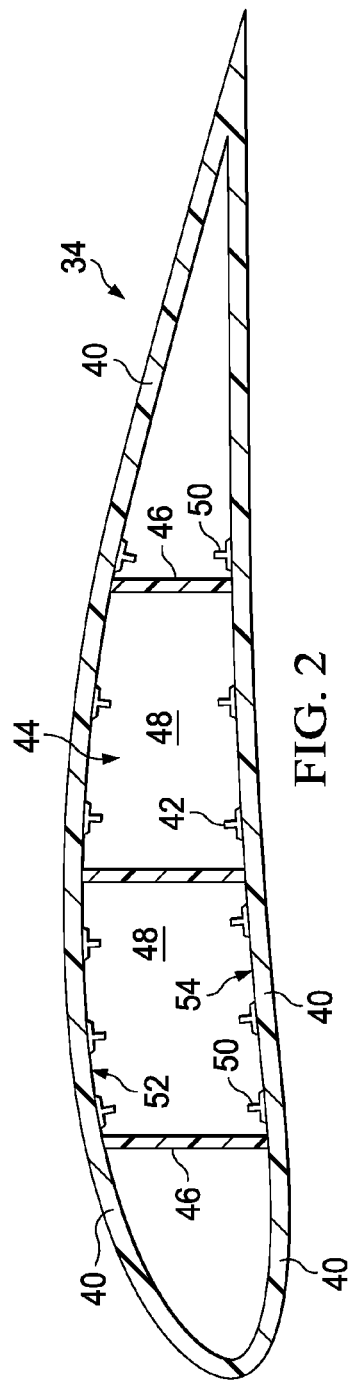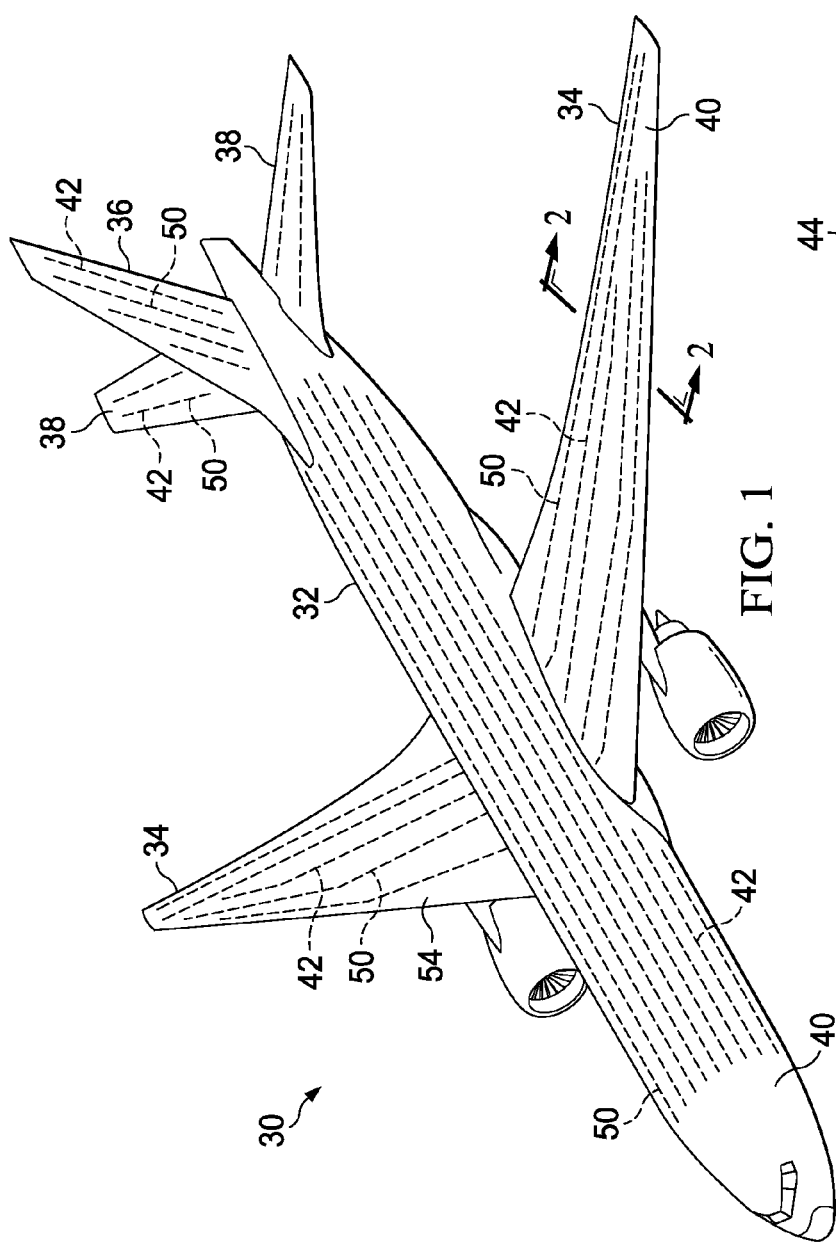
FIG. 1
FIG. 2

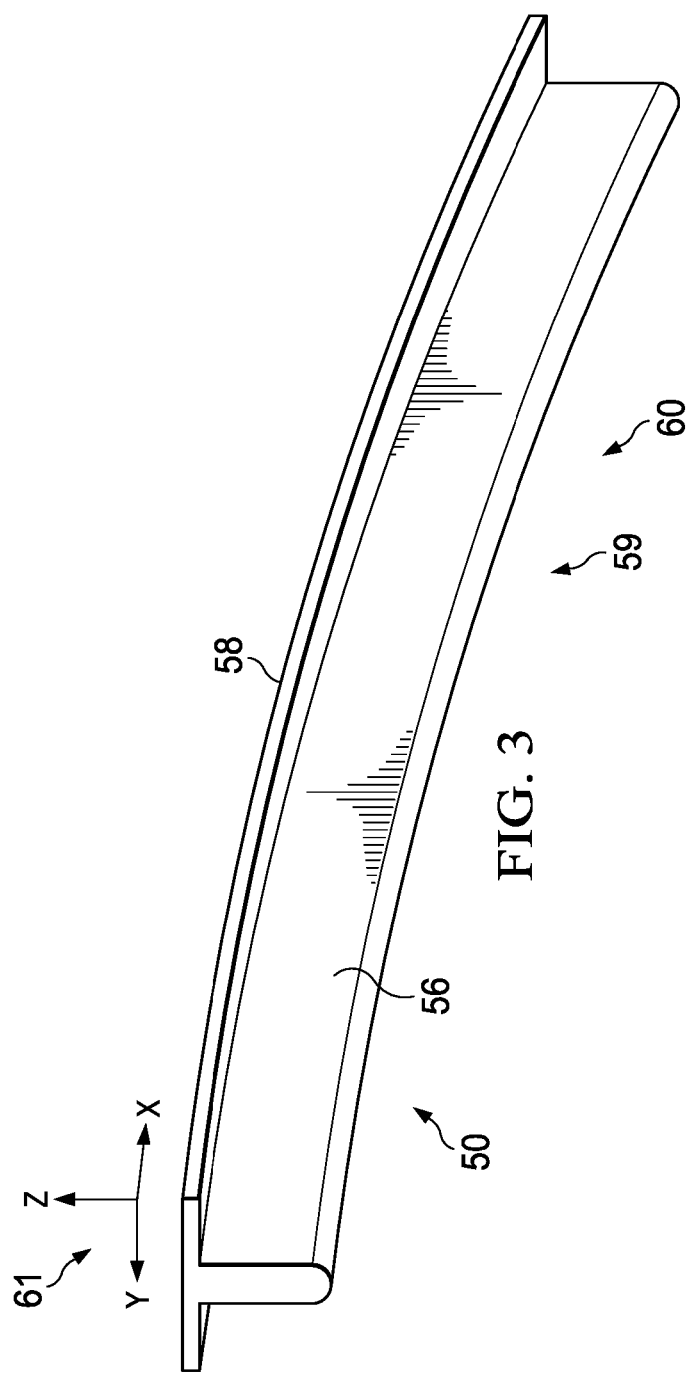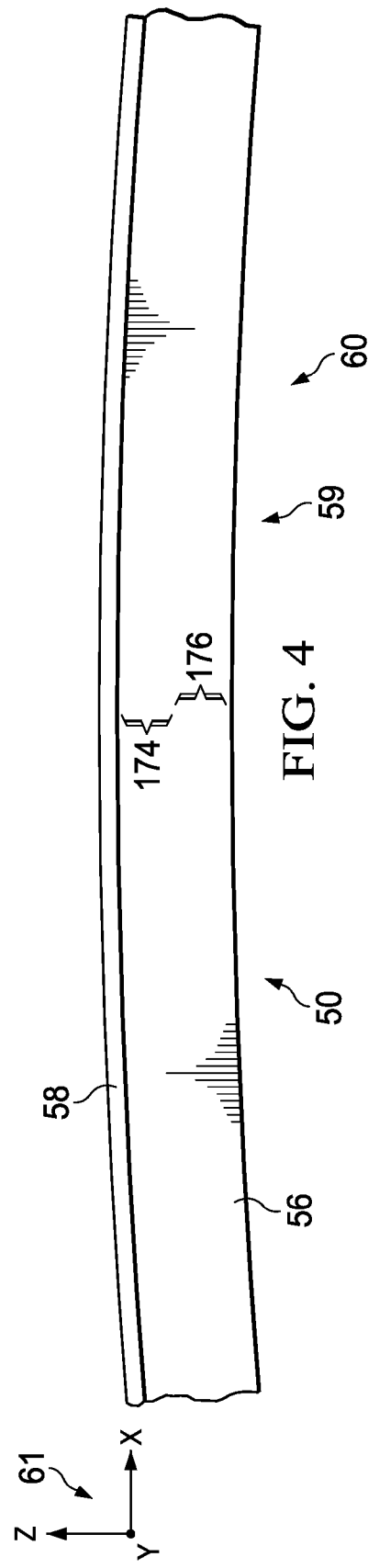

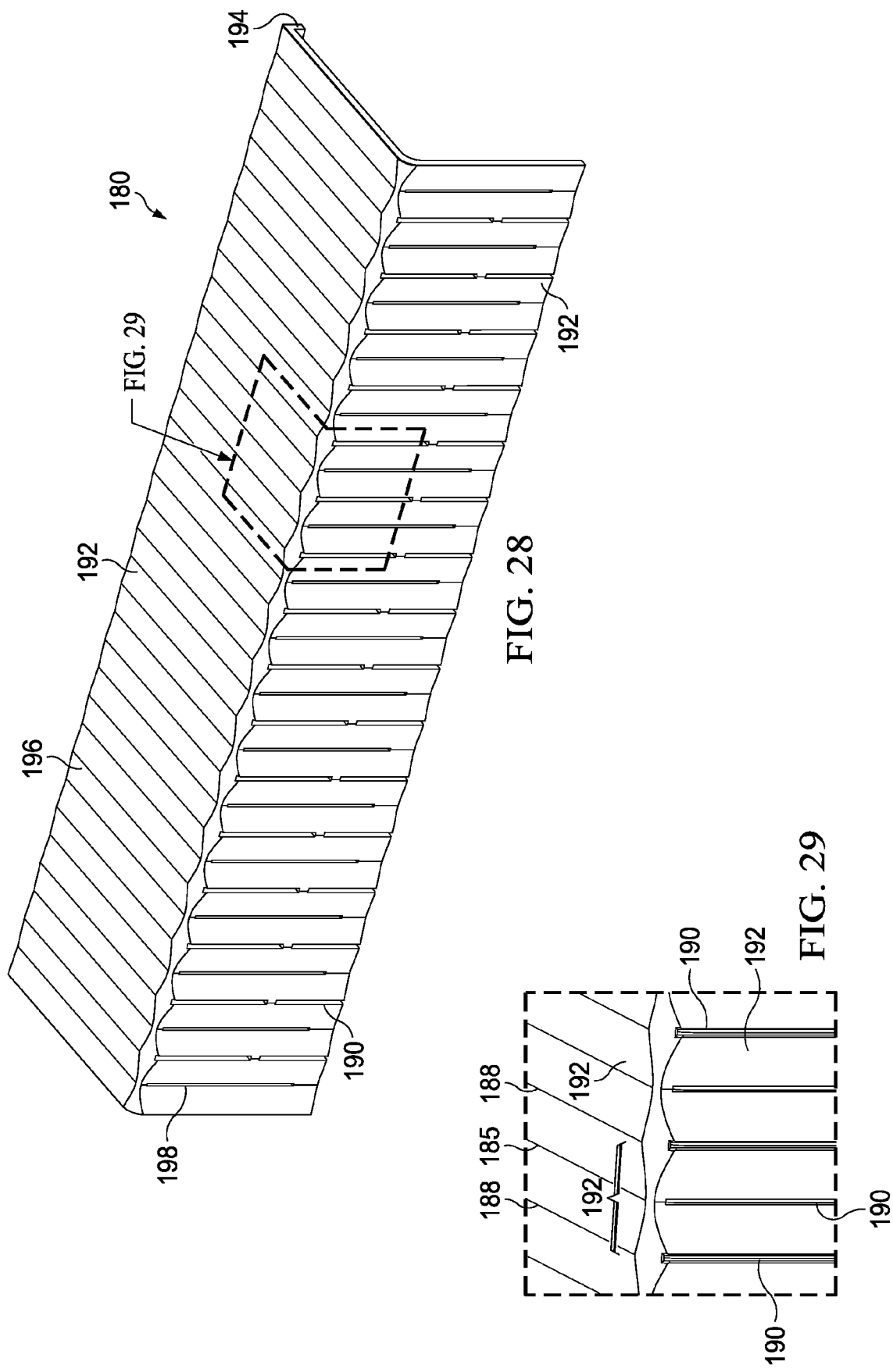

WRINKLE MITIGATION IN CONTOURED COMPOSITE STIFFENERS

BACKGROUND INFORMATION

1. Field

The present disclosure generally relates to methods and equipment for producing composite structures, and deals more particularly with a method and apparatus for mitigating wrinkling during contouring of composite laminate stiffeners.

2. Background

Fiber reinforced, composite laminate stiffeners such as stringers are frequently used in the marine, aircraft and other industries to transfer loads. In some applications, the stiffeners must be contoured along their lengths in order to conform them to a structure to which they are to be attached, such as a contoured aircraft skin. Difficulty can be encountered in producing highly contoured composite laminate stiffeners because of the tendency of the plies to wrinkle as they are being formed to a desired contour. As a stiffener is being contoured, the reinforcing fibers on the inside radius of the stiffener are compressed, which may cause the plies to buckle and form wrinkles. Ply wrinkling is undesired because it may undesirably affect stiffener performance and/or may limit the degree to which the stiffener can be contoured without unacceptable wrinkling.

Accordingly, it would be desirable to provide a method and equipment for producing contoured composite laminate stiffeners that reduce or eliminate ply wrinkling.

SUMMARY

The disclosure relates in general to methods and equipment for producing composite structures, and more particularly to compression mold tooling employing diffusers that reduce wrinkling of a composite laminate stiffener as it is being contoured along its length.

According to one aspect, apparatus is provided for forming a contoured composite laminate stiffener. The apparatus comprises first and second dies between which a multi-ply ply composite charge may be formed into a stiffener. The dies are configured to form a contour in the stiffener. The apparatus further includes at least a first diffuser positioned between the first die and the second die which is configured to diffuse wrinkles in the stiffener is being formed to the contour.

According to another aspect, apparatus is provided for making a contoured composite laminate stringer having a flange and a web. The apparatus includes a first die and a second die between which a multi-ply ply composite charge may be formed into a stringer shape having a flange and a web, and contoured along its length. A first wrinkle diffuser is mounted on the first die and a second wrinkle diffuser is mounted on the second die opposing the first wrinkle diffuser. The first and second wrinkle diffusers are configured to diffuse wrinkles in the flange and the web as the charges is being formed to the contour.

According to a further aspect, a method is provided of making a contoured composite laminate stiffener. A multi-ply ply composite charge along with at least one wrinkle diffuser are placed between first and second dies. The composite charge is formed into a stiffener having a desired cross-sectional shape by compressing the charge between the dies. The stiffener is formed to a desired contour having in inside radius. Wrinkling of the stiffener along the inside radius is controlled using the wrinkle diffuser.

One of the advantages of the disclosed method and apparatus is that ply wrinkling of composite laminate stiffeners during contouring is controlled, so that undesired ply wrinkling is reduced. Another advantage is that the size and/or other physical characteristics such as frequency and spacing of ply wrinkles is controlled to a level that does not materially affect stiffener performance. Still another advantage of the disclosed method and apparatus is that scrap and rework of stiffeners caused by unacceptable ply wrinkling is reduced or eliminated. A further advantage is that diffusers used to reduce ply wrinkling are readily adapted for use with existing tooling employed to form the stiffeners. Additionally, the diffusers are easily interchanged and/or replaced, thus allowing the diffusers to be used with different tools employed to form various configurations of stiffeners.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

FIG. 1 is an illustration of a perspective view of an airplane, wherein the locations of contoured stiffeners are shown in broken lines.

FIG. 2 is a sectional view taken along the line 2-2 in FIG. 1.

FIG. 3 is an illustration of a perspective view of a contoured blade stringer used in the wings of the airplane shown in FIGS. 1 and 2.

FIG. 4 is an illustration of a fragmentary, side elevational view of the contoured blade stringer shown in FIG. 3.

FIG. 28 is an illustration of a perspective view of a diffuser of the type installed on the lower die in FIG. 25.

FIG. 29 is an illustration of a fragmentary, enlarged perspective view of a portion of the diffuser shown in FIG. 28, designated as '29'.

DETAILED DESCRIPTION

Figure 5:
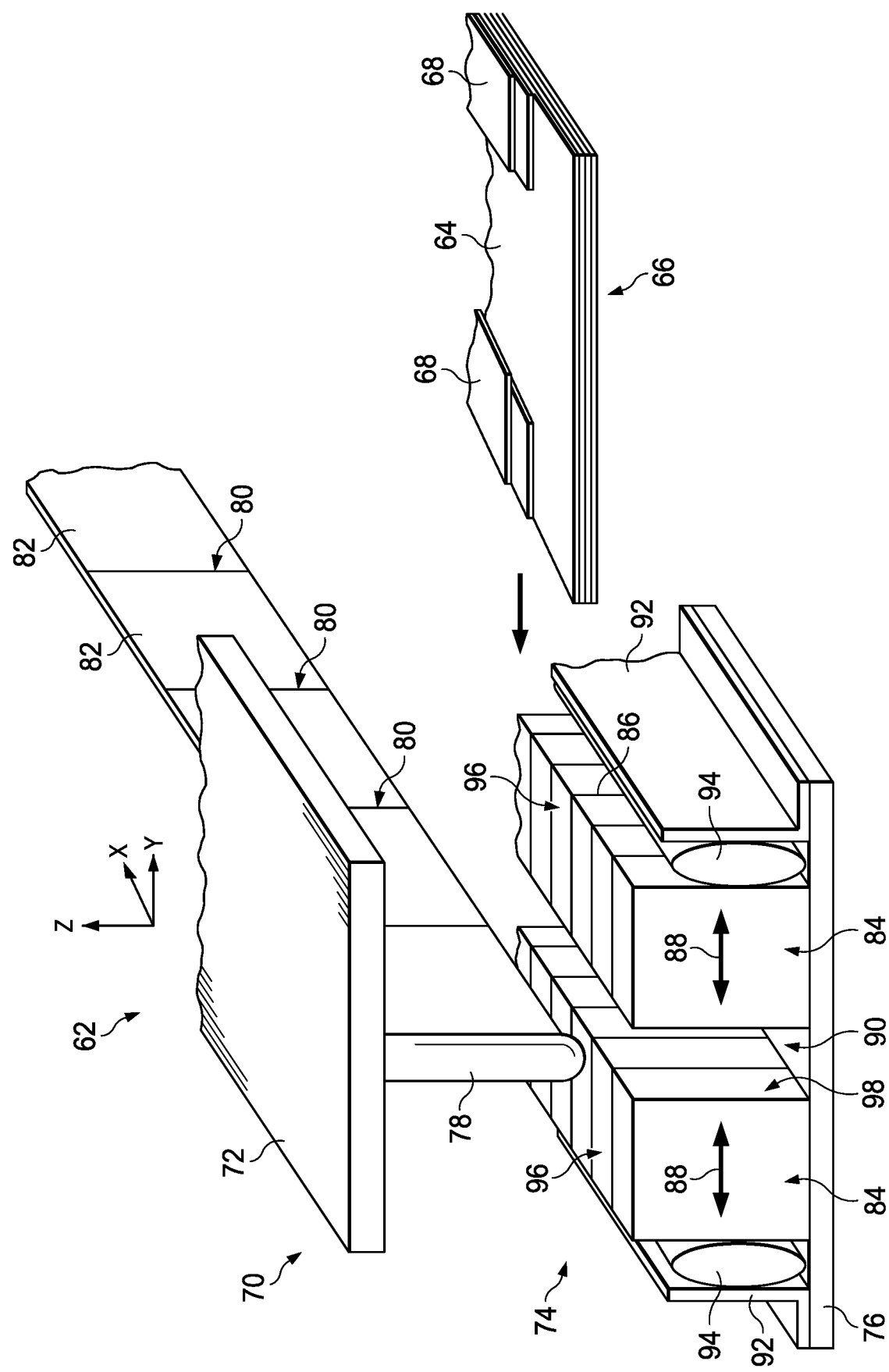
FIG. 5 is an illustration of a fragmentary, perspective view of tooling used to form the contoured blade stringer of FIGS. 2 and 3.

Referring first to FIGS. 1 and 2, an airplane 30 includes a fuselage 32, wings 34 and an empennage comprising a vertical stabilizer 36 and horizontal stabilizers 38. Each of these airframe components includes an outer skin 40 that is reinforced and stabilized by stiffeners 42 such as stringers 50. For example, as shown in FIG. 2, each of the wings 34 includes a wing box 44 formed by spars 46, ribs 48 and stringers 50 that are covered by a composite laminate skin 40 such as a carbon fiber reinforced polymer (CFRP) laminate. The wing box 44 includes an upper wing panel 52 and a lower wing panel 54. In the illustrated example, the stiffeners 42 are blade-type stringers 50, however, the principals disclosed herein are applicable to a wide range of other types of stringers such as, without limitation, I, J, Y, Z and hat stringers. Each of the stringers 50 is joined to the IML (inner mold line) of the skin 40, typically by co-curing or by co-bonding.

Depending upon the application, the stringers 50 may have various out of plane features such as contours, pad ups and/or joggles at one or more locations along their length. Contouring of the stringers 50 is sometimes necessary in order to match the contour of a skin 40 to which the stringers 50 are attached. For example, referring to FIGS. 3 and 4, a blade type stringer 50 such as that used in the wing of FIG. 2 comprises a blade 56, sometimes also referred to herein as a web 56, and a flange 58 extending perpendicular to the blade 56. In this example, the stringer 50 has a contour 60 along its entire length in the XZ plane within coordinate system shown at 61, however in other examples the stringer 50 may have straight sections as well as local contours along its length. The stringer shown in in FIGS. 3 and 4 is concave downwardly however it may be concave upwardly, depending on the application. Further, the stringer 50 may have one or more contours along its length in the XY plane, and in some examples, the stringer 50 may have compound contours comprising contours in both the XZ and XY planes. Each of the web 56 and the flange 58 may have a variable thickness at one or more locations along their lengths in order to conform the stringer 50 to localized features of the structure to which it is attached.

Attention is now directed to FIG. 5 which illustrates one form of tooling 62 using compression dies that form the blade type stringer 50 or a similar stiffener 42 using a fiber-reinforced composite charge 64 (hereinafter referred to as a "charge"), which in the illustrated example is generally flat and comprises multiple plies 66 of a fiber reinforced composite material. The charge 64 may also include pad-up plies 68. The plies 66 may comprise a fiber-reinforced polymer such as, for example and without limitation, a thermoset or thermoplastic reinforced with continuous fibers such as carbon fibers. The tooling 62 broadly comprises an upper die 70 mounted on an upper flexible plate 72, and a lower die 74 mounted on a lower flexible plate 76. The upper die 70 includes a punch 78 having a blade-like shape that is provided with slits 80 along its length. The slits 80 segment the punch 78 into a plurality of punch portions 82 that allow the punch 78 to flex along its length.

The lower die 74 comprises a pair of die blocks 84 that are segmented 86 along their lengths. The die blocks 84 are spaced apart from each other to form a die cavity 90 into which the charge 64 can be formed by the punch 78 as the upper die 70 is closed against the lower die 74. The die blocks 84 are laterally slideable 88 toward and away from each other on the lower flexible plate 76. Segmentation 86 of the die blocks 84 allows them to flex along their lengths.

A pair of L-shape brackets 92 are mounted on and extend along the length of the lower flexible plate 76, on opposite sides of lower die 74. The L-shape brackets 92 function to both retain the die blocks 84 on the lower flexible plate 76, and react lateral forming forces generated by the die blocks 84 during a forming operation. A pair of inflatable hoses 94, sometimes referred to as bags or bladders, are sandwiched between the L-shape brackets 92 and the die blocks 84, and are adapted to be coupled with a suitable source of pressurized air (not shown). The inflatable hoses 94 may be selectively pressurized in order to apply a lateral force on the die blocks 84 during forming and/or contouring operations. Other mechanisms, however, may be provided to apply the lateral force to the die blocks 84.

As mentioned earlier, the flange 58 of the stringer 50 may have a variable thickness in localized areas along its length in order to conform the stringer 50 to local contours of the structure to which it is attached, such as a skin 40. In order to accommodate these thickness variations so that a constant pressure is evenly applied to the composite charge 64 in these localized areas, shims (not shown) may be placed on or beneath the die blocks 84, as necessary along their length so as to conform to the local contours caused by these thickness variations. As the charge 64 is formed to a desired contour, both of the die blocks 84 flex as necessary to maintain a constant forming pressure on the charge 64. As will be discussed below, during a forming operation, a charge 64 is place on the top 96 of the die blocks 84, and the upper and lower dies are closed against each other at a controlled rate, effectively punch forming the charge 64 to the desire stringer cross sectional shape. In the illustrated stringer example, the flange 58 of the stringer 50 is formed between the top 96 of the die blocks 84 and the upper plate 72, while the blade or web 56 of the stringer 50 is formed between the punch 78 and the sides 98 of the die blocks 84.

Figure 6:
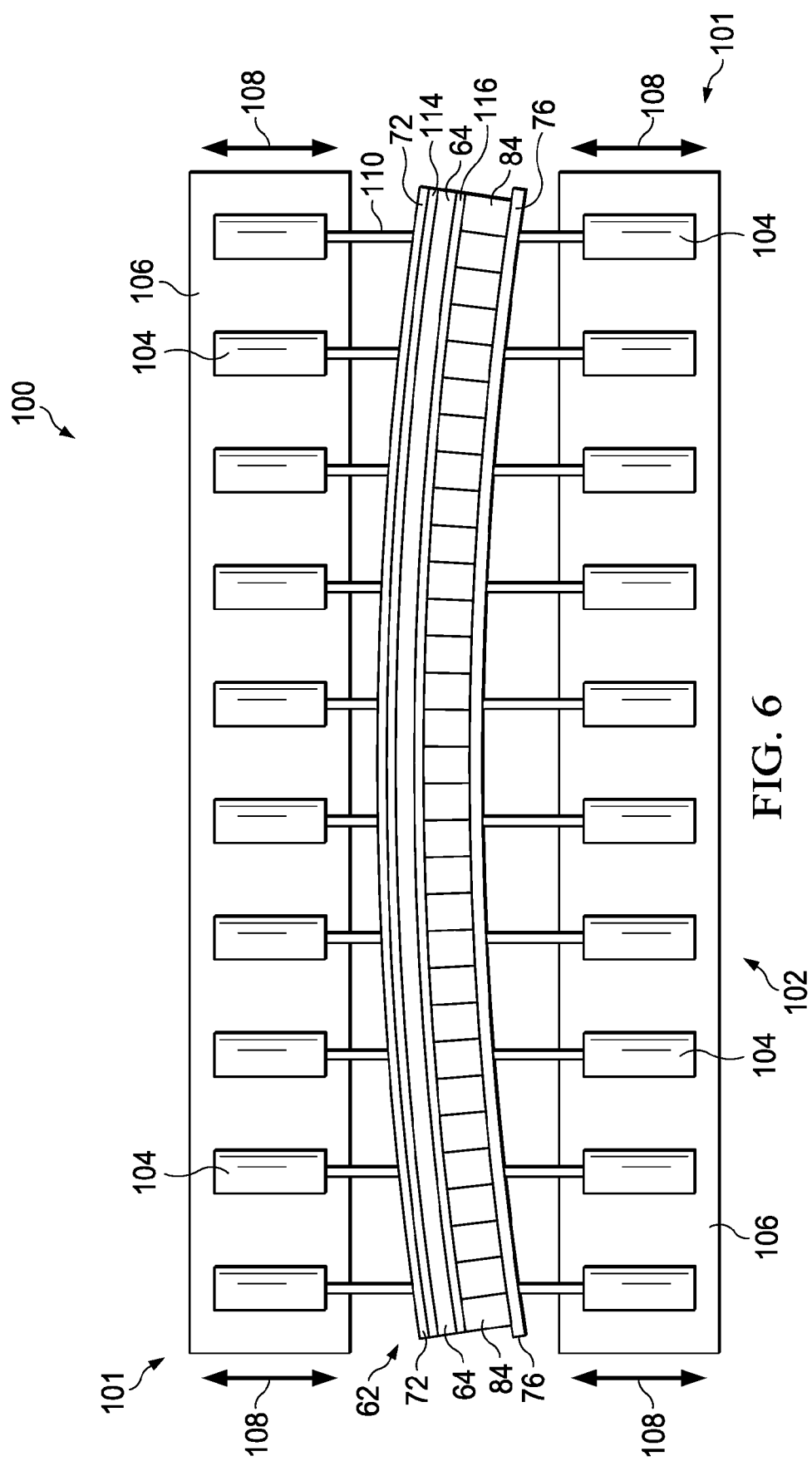
FIG. 6 is an illustration of a side view of a former including a die changing mechanism used to contour a stringer.

FIG. 6 illustrates a former 100 which incorporates the tooling 62 shown in FIG. 5, along with a die changing mechanism 101. The die changing mechanism 101 may comprise, for example and without limitation, a press 102 and a plurality of individual, spaced apart actuators 104. The actuators 104 are respectively mounted on opposing press plates 106 of the press 102 that are adapted for movement toward and away from each other, indicated by the arrows 108. The tooling 62 is installed between the press plates 106. The press plates 106 may be coupled with any suitable power operated mechanisms such as cylinder actuators (not shown) which displace the press plates 106 to open/close the tooling 62 during a charge forming operation.

The die changing mechanism 101 changes the shape of the dies 70, 74, thereby contouring the partially formed charge 64. This contouring process causes portions of the charge 64 to be placed in tension while other portions are placed in compression. Compression of the charge 64 in this manner results in the formation of wrinkles in the plies 66 of the charge 64, typically along the inside radius 59 of the contour 60. According to one aspect of this invention however, wrinkle diffusers, discussed in more detail below (but not shown in FIG. 6) are installed between the charge 64 and the upper and lower dies 70, 74 and function to control wrinkling and/or buckling of the charge 64 during a contouring operation. Each of the actuators 104 includes a plunger 110 coupled with one of the upper and lower flexible plates 72, 76 that applies a bending force to these two plates in order to bend them to a desired stringer contour. Bending the upper and lower flexible plates 72, 76 in turn bends the die blocks 84, thereby contouring the stringer 50 along its length. Other mechanisms however, may be employed to contour the tooling 62 along its length. In some examples, the charge 64 is first punch formed to the desired stringer cross sectional shape, and is subsequently contoured along its length by the die changing mechanism 101. In other examples however, the dies 70, 74 are first contoured by the die changing mechanism 101, following which the charge 64 is punch formed to the desired cross sectional shape.

Figure 7:
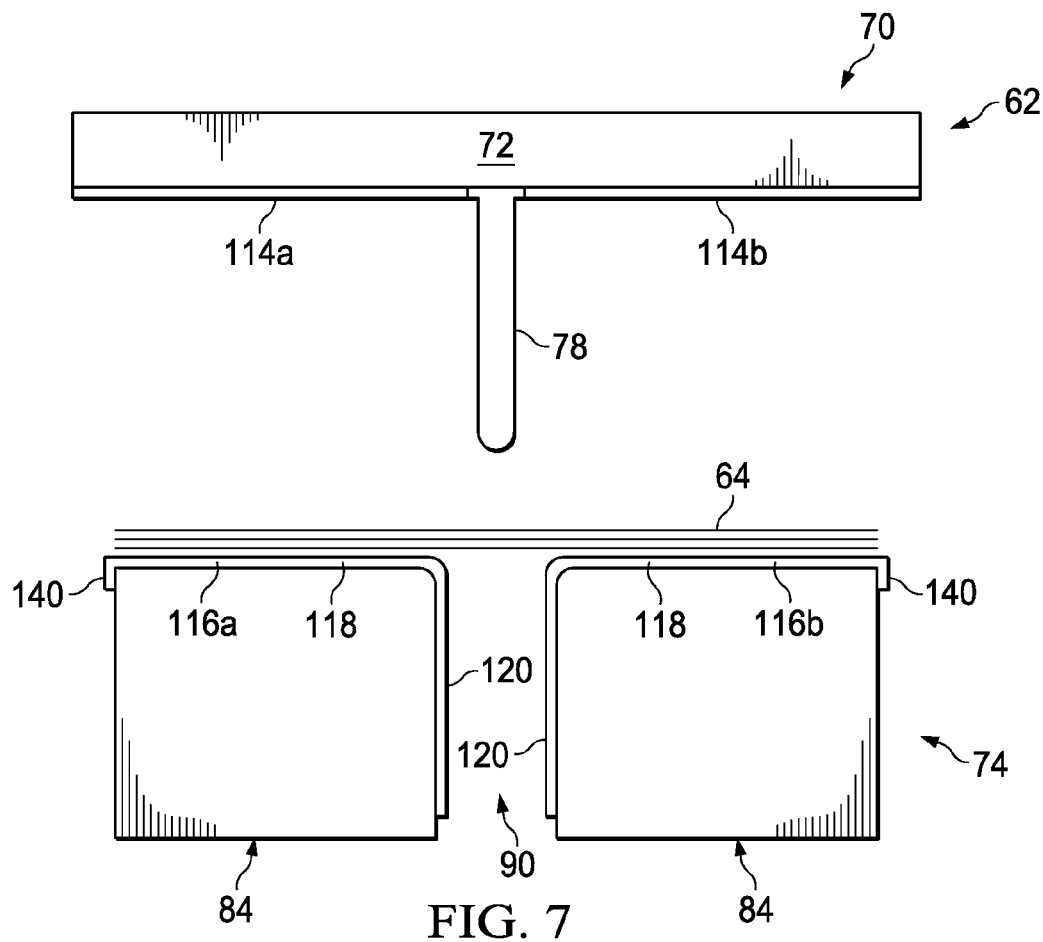
FIGS. 7-10 are illustrations of end views of the tooling of FIG. 5, showing the successive stages of a process for forming a composite charge into a blade stringer.

The sequential steps for forming a charge 64 into a desired stringer cross sectional shape are shown in FIGS. 7-10. Referring first to FIG. 7, a pair of first wrinkle diffusers 114*a*, 114*b*, also referred to herein as upper diffusers 114*a*, 114*b*, are installed on the upper die 70, on opposite sides of the punch 78. A pair of second wrinkle diffusers 116*a*, 116*b*, also referred to herein as lower diffusers 116*a*, 116*b* are installed on the die blocks 84 of the lower die 74. The upper diffusers 114*a*, 114*b* and lower diffusers 116*a*, 116*b* function to control wrinkling of the charge 64 as it is being formed into a desired stringer contour 60 (FIG. 4) by diffusing the wrinkles into a series of smaller wrinkles having a predetermined length-to-depth ratio.

Figure 8:
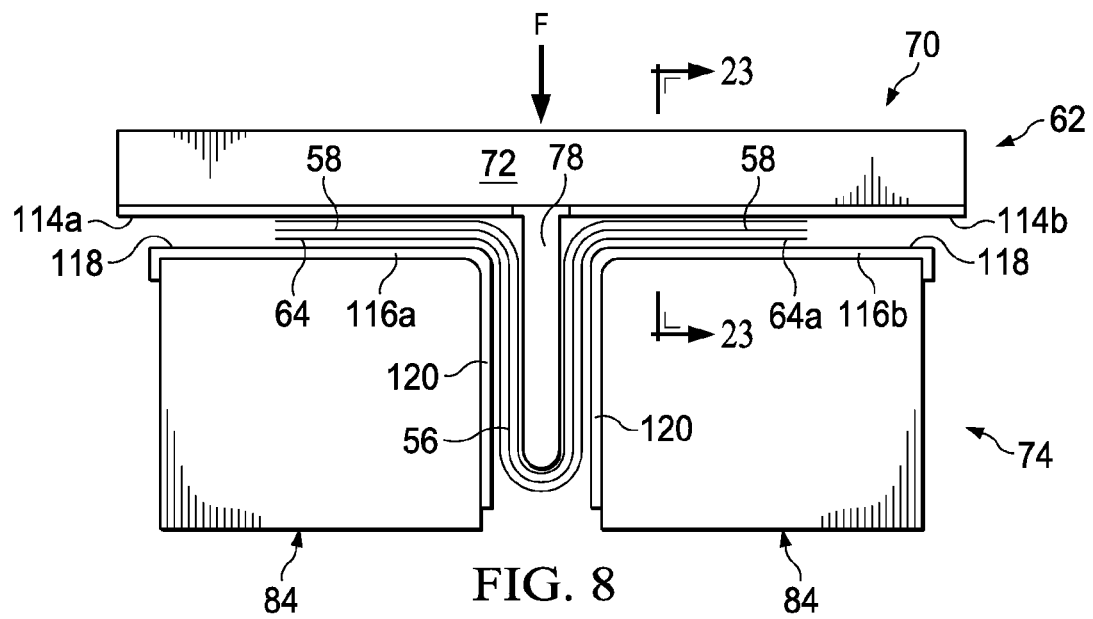

With the upper die 70 in a raised position (FIG. 7) and the die blocks 84 in their open, spaced apart position, a flat, multi-ply ply composite charge 64 is placed on the lower die 74, overlying flange sections 118 of the lower diffusers 116*a*, 116*b*. Next, as shown in FIG. 8, a downward force F is applied to the upper die 70, causing the punch 78 to form the charge 64 into the die cavity 90 while the upper plate 72 compresses the flanges 58 of the charge 64 against the die blocks 84. With the partially formed charge 64 restrained between the upper and lower dies 70, 74, the charge 64 is contoured along its length using the die changing mechanism 101 as described earlier in connection with FIG. 6. During this contouring operation, the inside radius 59 of portions of both the web 56 and the flange 58 are placed in compression, which may cause them to wrinkle or buckle along the contour 60. As will be discussed later, the wrinkle diffusers 114, 116 are configured to diffuse the wrinkles in a manner that reduces any undesired effect on the performance of the stiffener 42.

Figure 9:
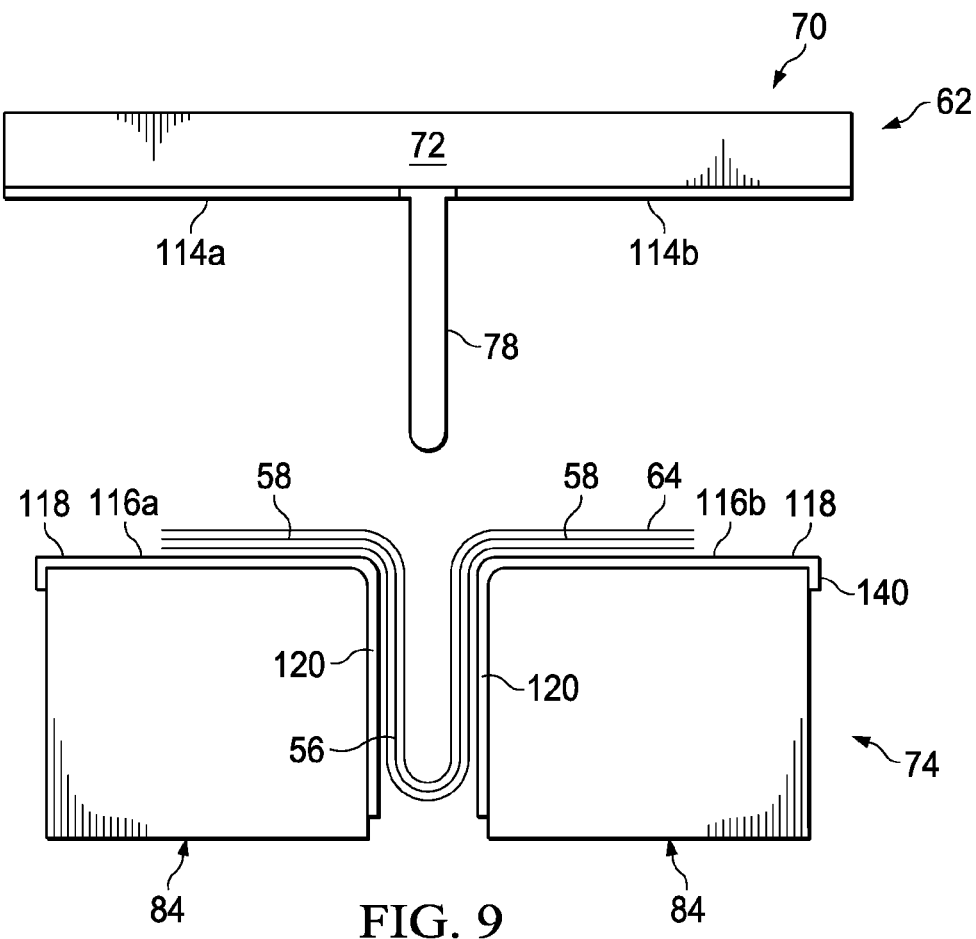
Figure 10:
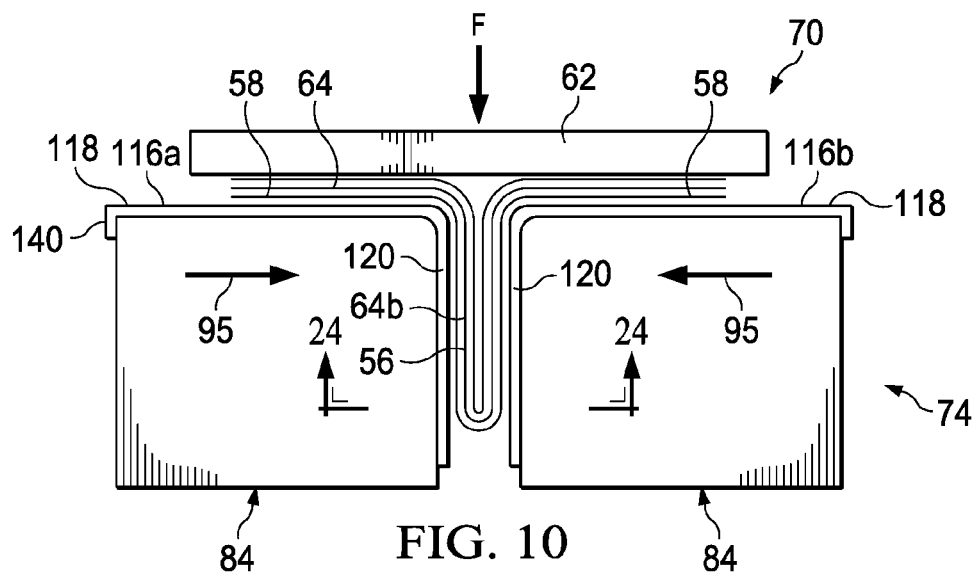

Referring to FIG. 9, following the contouring operation, the upper die 70 is displaced upwardly, causing the punch 78 to be withdrawn from the die cavity 90. Next, as shown in FIG. 10, the upper die 70 is replaced by a flat plate 112, which is placed on top of the flange 58 of the partially formed charge 64. A downward force F is applied to the flat plate 112 which causes it to force the left and right portions of the flange 58 against the die blocks 84, thereby restraining the flange 58. With the flange 58 restrained by the flat plate 112, the die blocks 84 are forced 95 toward each other, causing the open web 56 to close and form a blade 56. In the example described above in connection with FIGS. 7-10, the charge 64 is punch formed to a desired cross-sectional shape before it is contoured along its length. However, in other examples, the dies 70, 74 are first changed to the desired contour by the die changing mechanism 101, following which the charge 64 is punch formed into the contoured dies 70, 74, thereby simultaneously forming and contouring the stiffener 42.

Figure 11:
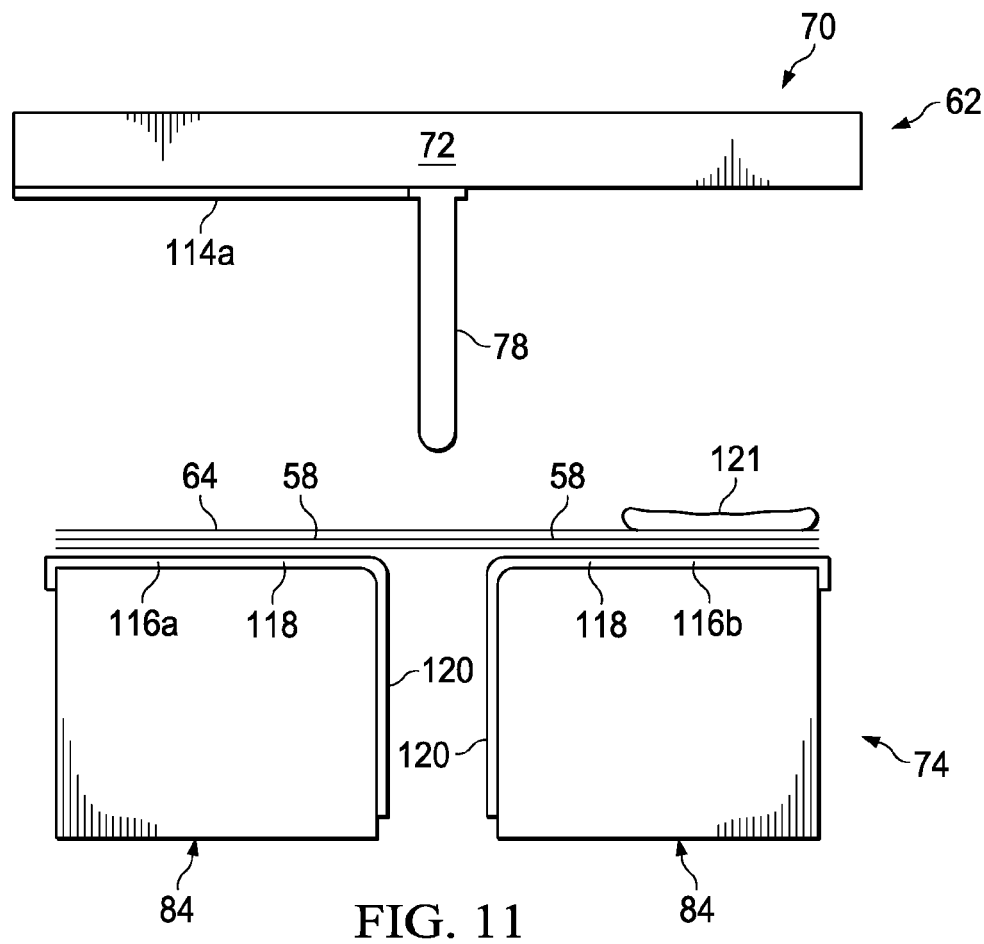
FIG. 11 is an illustration of an end view of the tooling, similar to FIG. 7, but showing an inflatable bladder placed on a flange portion of the charge.
Figure 12:
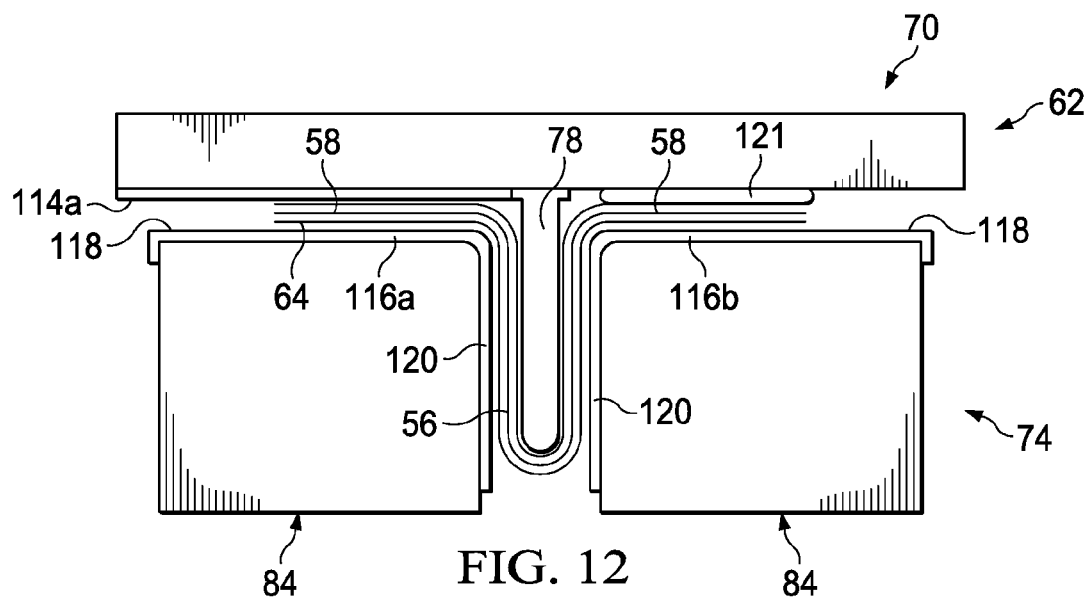
FIG. 12 is an illustration similar to FIG. 11, but showing the upper and lower dies closed against each other, and the bladder inflated to apply pressure to the flange portion of the stringer.

The type and placement of the diffusers 114, 116 on the dies 70, 74 will vary with the application. Depending on the geometry of the stiffener 42, the number and severity of the contours and other factors, the diffusers 114, 116 may be installed on some tool surfaces of the dies 70, 74 but not on others. For example, referring to FIG. 11, an upper diffuser 114*a* is installed on the upper die 70 on only the left side of the punch 78. In order to assure that equal pressure is applied to both the left and right portions of the flange 58 of the charge 64 during the forming process, an inflatable bladder 121 is placed on the right portion of the flange 58. When inflated (FIG. 12), the inflatable bladder 121 applies pressure to the right portion of the flange 58, substantially equal to the pressure applied to left portion by the upper diffuser 114*a*. During the forming process, the inflatable bladder 121 is deflated at a controlled rate in order to reduce the applied pressure enough to allow the right portion of the flange 58 to slip between the upper die 70 and the die block 84, similar to slippage of the left portion as the punch 78 forms the charge 64 into the die cavity 90.

As will be discussed below, the diffusers 114, 116 function to control the dimensions and geometry of the wrinkles that are formed in the charge 64 in those areas of the stiffener 42 that are placed under compression during the forming/contouring process, such as along the inside radius 59 of contours 60 or other out-of-plane features in the stiffener 42. Rather than allowing wrinkles of uncontrolled size, shape, and spacing to form, which may have an undesirable effect on stiffener performance, the wrinkling is diffused by forcing the formation of wrinkles that are a desired size, shape, and/or spacing, and thereby are configured to have minimal or no effect on stiffener performance. This controlled wrinkling is achieved by providing depressions in the diffusers 114, 116 into which the portions of the charge 64 may strain as a result of the compressive stresses in the charge 64 caused by the forming/contouring process.

Figure 13:
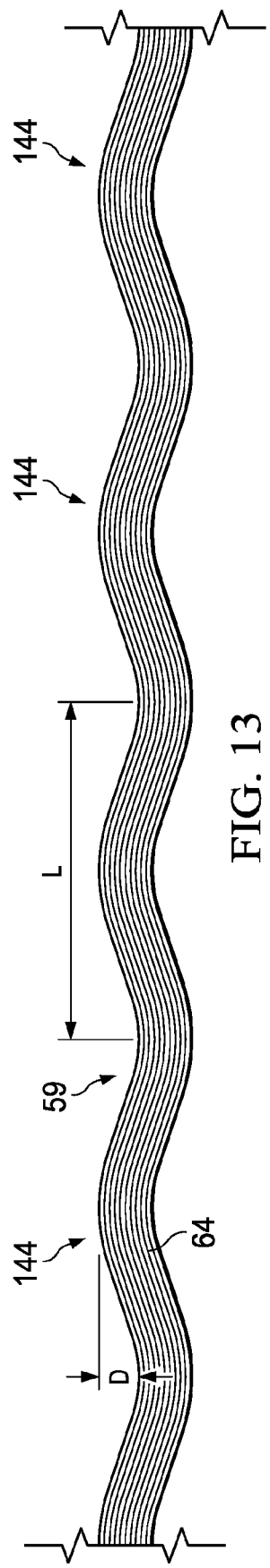
FIG. 13 is an illustration of a fragmentary side view of a composite laminate charge that has been formed to a contour using one example of a wrinkle diffuser, the contour not shown.
Figure 14:
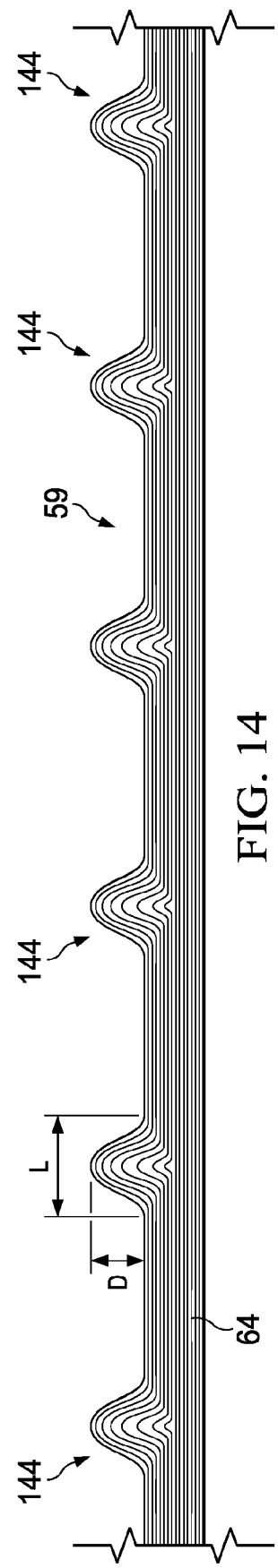
FIG. 14 is an illustration of a fragmentary side view of a composite laminate charge that has been formed to a contour using another example of a wrinkle diffuser, the contour not shown.

FIG. 13 illustrates one example of diffused wrinkles 144 formed by the diffusers 114, 116 in a charge 64 along an inside radius 59 of the contour 60 (FIGS. 3 and 4) in the stiffener 42. In this example, the wrinkles 144 form a sine wave pattern in which each of the wrinkles 144 has a preselected length L (wavelength) and depth D, resulting in a desired length-to-depth (L/D) ratio. Although a sine wave pattern of wrinkles is shown in FIG. 13, the diffusers 114, 116 may be configured to produce various other patterns of wrinkles 144 having a desired L/D. Depending upon the geometry of the stiffener 42, the wavelength L and/or the depth D of the wrinkles 144 may vary along the length of the stiffener 42 in order to address local stiffener conditions such as changes in the geometry of the stiffener 42. Another example of diffused wrinkles 144 that can be formed by the wrinkle diffusers 114, 116 is shown in FIG. 14, wherein individual wrinkles 144 are formed that have length L and a depth D. In this example, the wrinkles 144 are formed only on one side of the charge 64, for example on the inside radius 59 of the stiffener 42. However, depending upon the geometry of the stiffener 42, the wrinkles 144 may be formed on both sides of the charge 64. In the example shown in FIGS. 13 and 14, the length L is constant, however in other examples, the length L of the wrinkles 144 may vary to address local stiffener conditions, such as where there is variation in the contour 60 of the stiffener 42. As will become apparent below, a variety of other controlled wrinkle configurations can be achieved using the wrinkle diffusers 114, 116.

Attention is now directed to FIGS. 15-18 illustrating one example of the diffusers 114, 116, which respectively may be sometimes referred to herein as first and second diffusers 114, 116, or upper and lower diffusers 114, 116. Each of the upper diffusers 114 comprises a plurality of interconnected plates 117, each formed of a flexible material such as a metal or a composite may be removably attached to the upper die 70 by any suitable means, such as magnets or fasteners (not shown). Each of the plates 117 includes a plurality of spaced apart depressions 122 therein along its length, each of which is configured to form a wrinkle having a desired length L and depth D. In the illustrated example, the depressions 122 comprise first depressions 122*a* and second depressions 122*b* in the form of slots or gaps that are arranged in alternating relationship to each other. As used herein, the term "depressions" includes, without limitation gaps, slots, cavities, voids, pockets and similar out-of-plane features in the surface of the plate 117 that form spaces into which portions of the charge 64 may strain as a result of compressive stresses in the charge 64.

In the example shown in FIGS. 15-18, the plates 117 are interconnected by interlocks 132 comprising tabs 134 in one end of the plate 117 that are received within matching notches 136 in the end of an adjoining plate 117. Other techniques for interconnecting the plates 117 are possible. Also, depending on the length of the stiffener 42 being formed, each of the plates 117 may comprise a single piece, rather than multiple, interconnected pieces. As previously mentioned, the upper diffusers 114 can be removably attached to the upper die 70 using any of several techniques, including fasteners or magnets. In one example, magnets (not shown) installed on the upper die 70, are received within recesses 138 in the backside of the plates 117, thus providing a means of removably holding the plates 117 in proper registration on the upper dies 70. In other examples, the plates 117 can be permanently attached to, embedded or otherwise incorporated into the upper dies 70.

Figure 18:
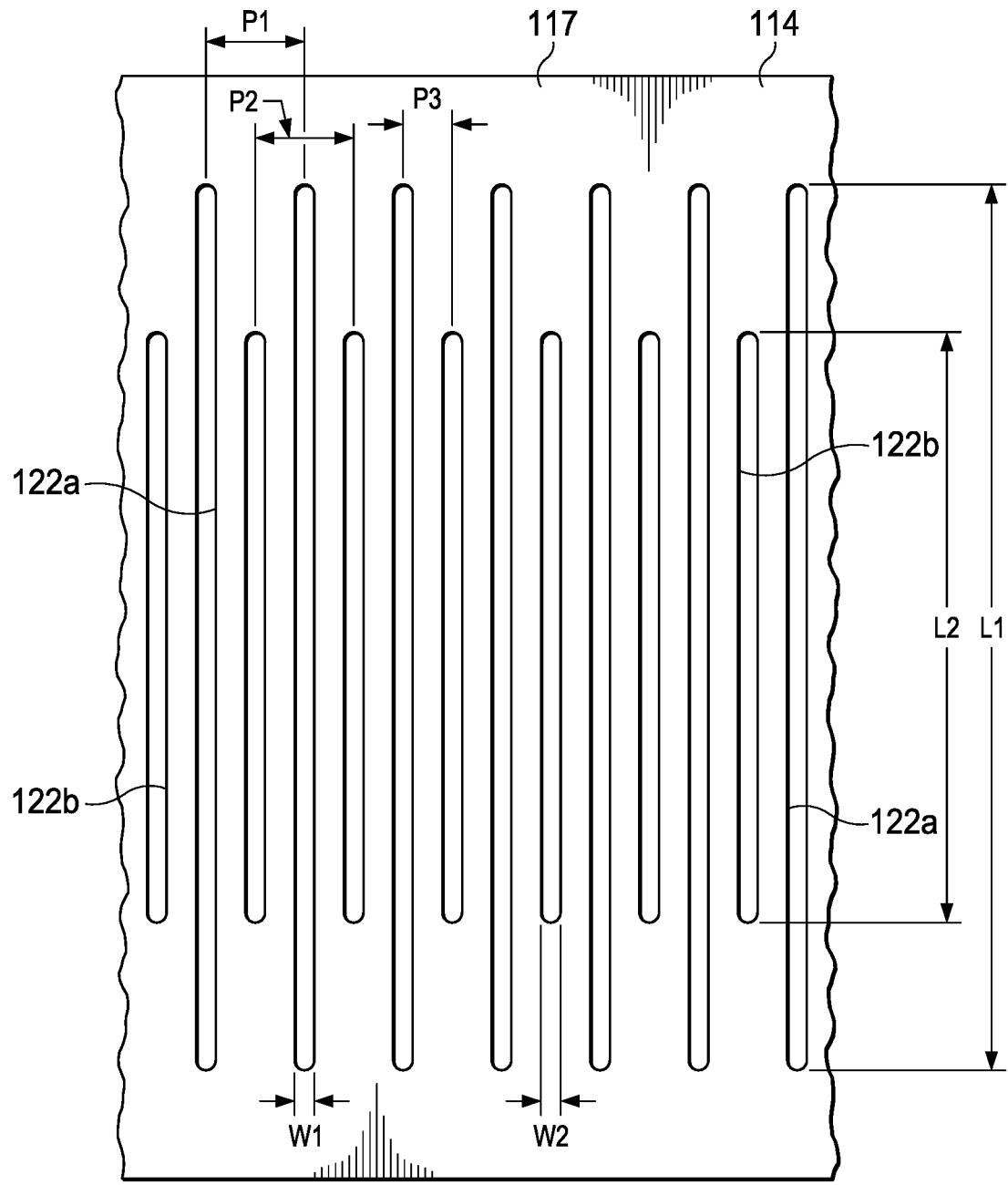
FIG. 18 is an illustration of a fragmentary, plan view of a portion of the diffuser shown in FIG. 16.

Referring particularly to FIG. 18, the dimensions of the depressions 122*a*, 122*b* will vary depending on the application, as well as the length L and depth D of the wrinkles 144 that are to be formed. In the illustrated example, the depressions 122*a*, 122*b* are in the shape of slots, however other shapes are possible. The depressions 122*a* each have a length L1 that is greater than the length L2 of the depressions 122*b*. The widths W1, W2 of the depressions 122*a*, 122*b* may be the same or different from each other, and will depend upon the dimensions of the wrinkles 144 to be formed. Finally, the pitch P1 between the depressions 122*a*, the pitch P2 between depressions 122*b*, and the pitch P3 between depressions 122*a*, 122*b* will also vary depending on the dimensions of the wrinkles 144 to be formed. Additionally, although not shown in FIG. 18, the depths of the depressions 122*a*, 122*b* are selected to achieve a desired depth D of the wrinkles 144.

Figure 19:
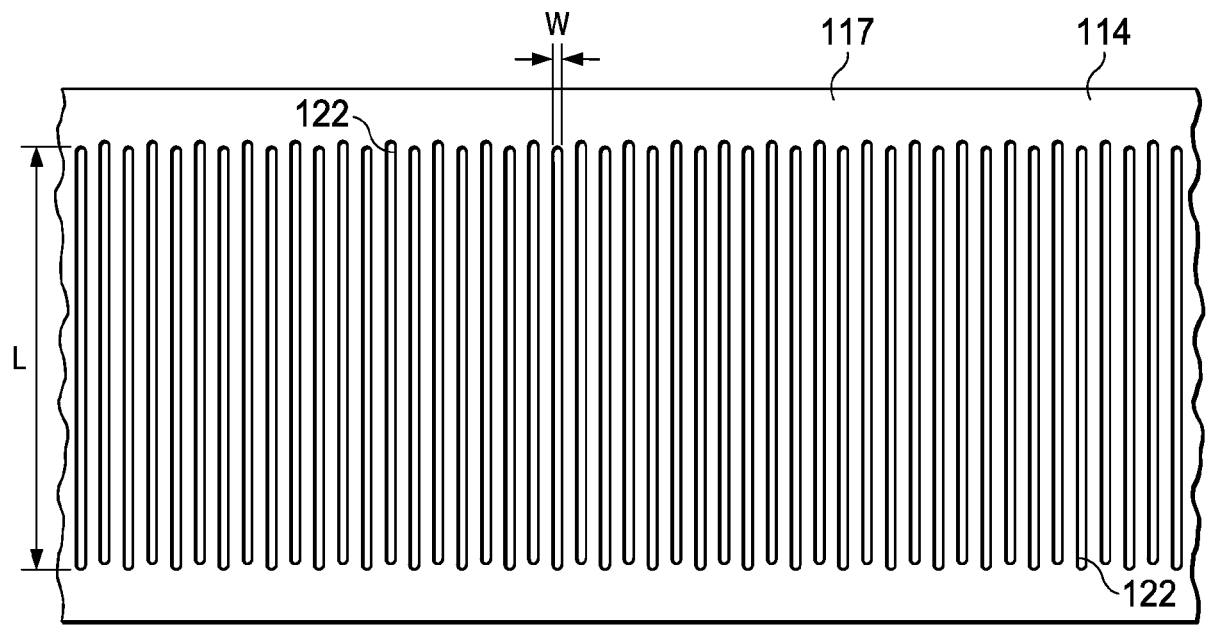
FIG. 19 is an illustration of a fragmentary plan view of another example of a diffuser for the upper die.
Figure 20:
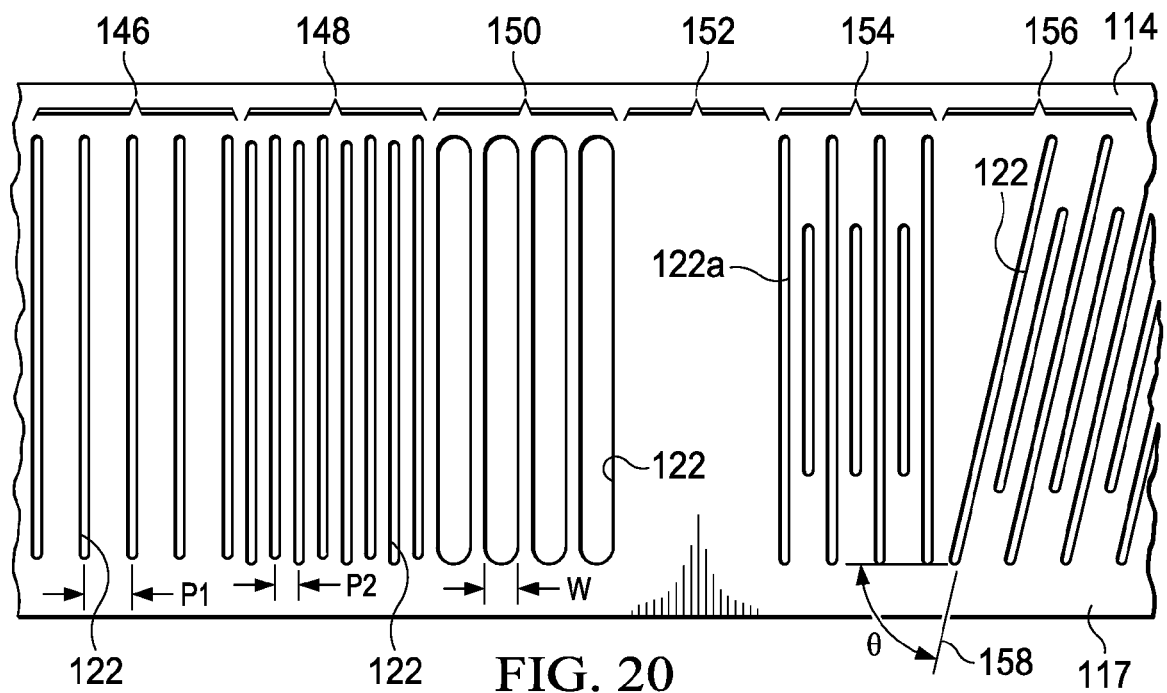
FIG. 20 is an illustration of a fragmentary plan view of a further example of a diffuser for the upper die, showing different sizes, distributions and orientations of the depressions in the diffuser.

FIG. 19 illustrates another example of an upper diffuser 114 in which depressions 122 in the form of slots are equally spaced, and have the same lengths L, width W and depth D. As previously mentioned, the size, shape and frequency of the depressions 122 may vary along the length of the upper diffuser 114. For example, FIG. 20 illustrates an upper diffuser 114 having various forms of depressions 122 in different sections 146-156 of the plate 117. The depressions 122 in section 146 have the same widths and lengths as those in an adjoining section 148 but have different pitches P1, P2. The depressions 122 in another section 150 have a width W greater than those in sections 146 and 148. Section 152 is devoid of any depressions 122, while an adjoining section 154 includes depressions 122*a*, 122*b* of two different lengths. Depending on local stiffener geometry, one or more sections 156 of the upper diffuser 114 may include depressions 122 that are oriented at an angle relative to the longitudinal axis 158 of the diffuser 114.

Figure 15:
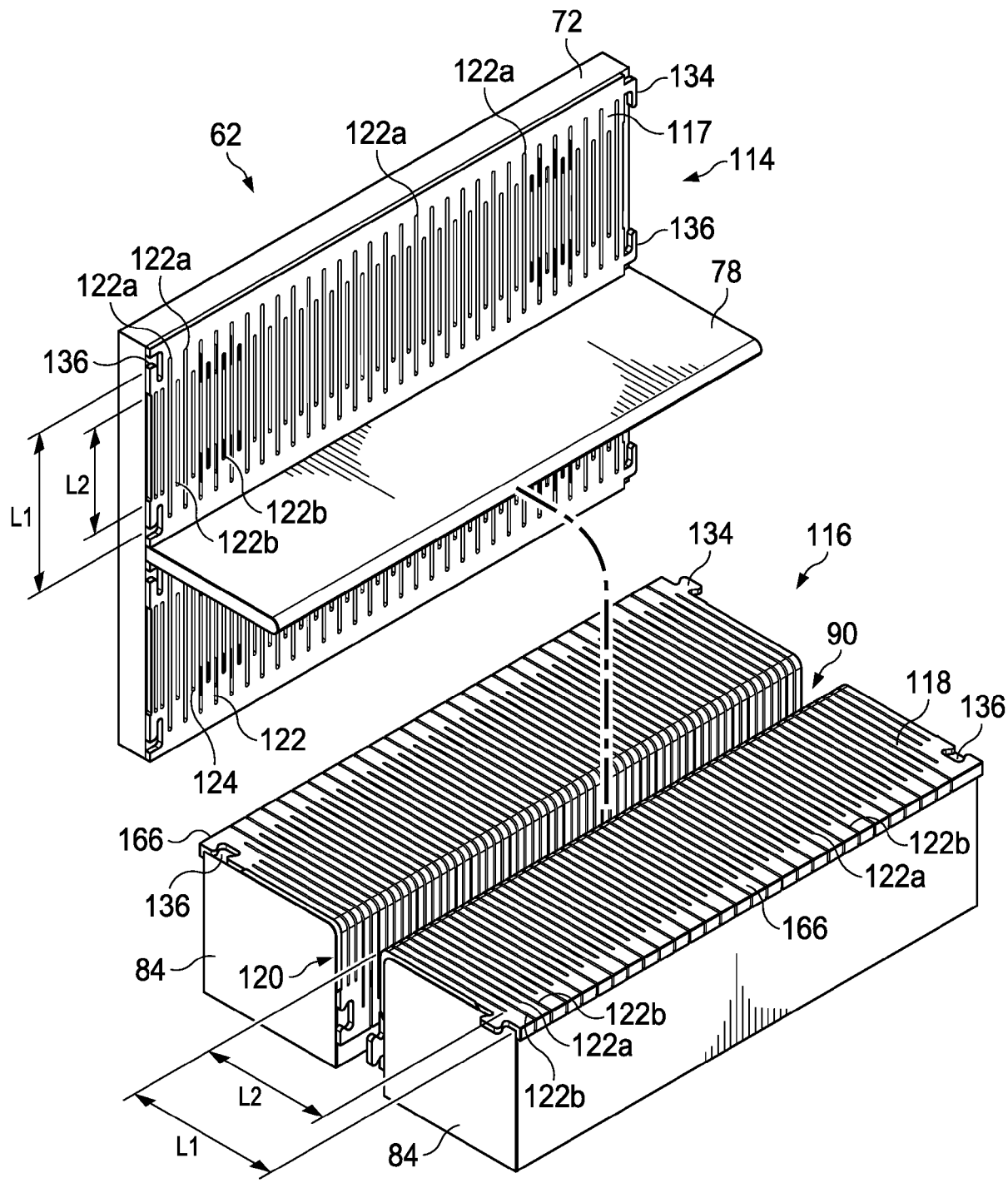
FIG. 15 is an illustration of a perspective view of the tooling of FIG. 5, showing one example of diffusers installed on the upper and lower dies for reducing ply wrinkling during forming of a stringer to a contour.
Figure 16:
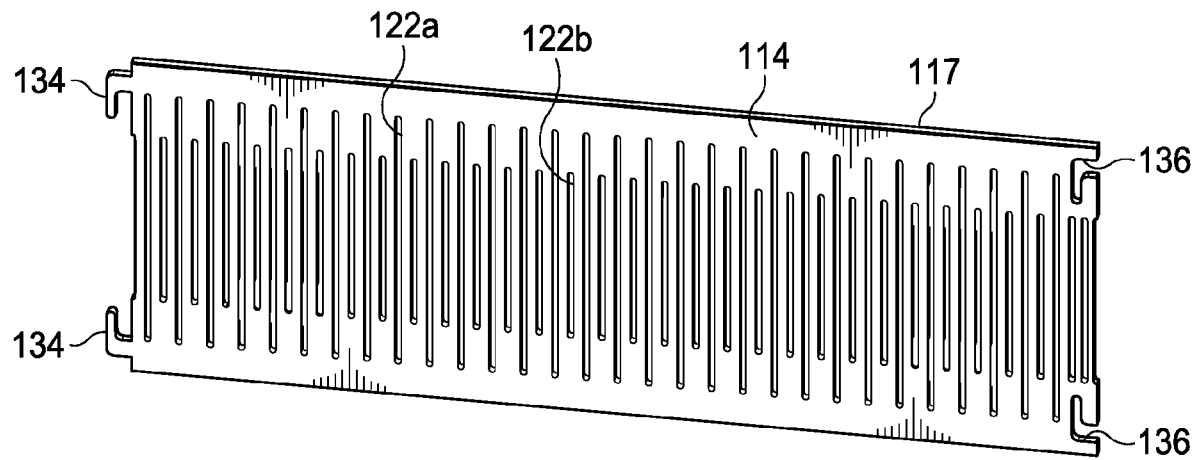
FIG. 16 is an illustration of a perspective view of the front side of one of the diffusers for the upper die.
Figure 17:
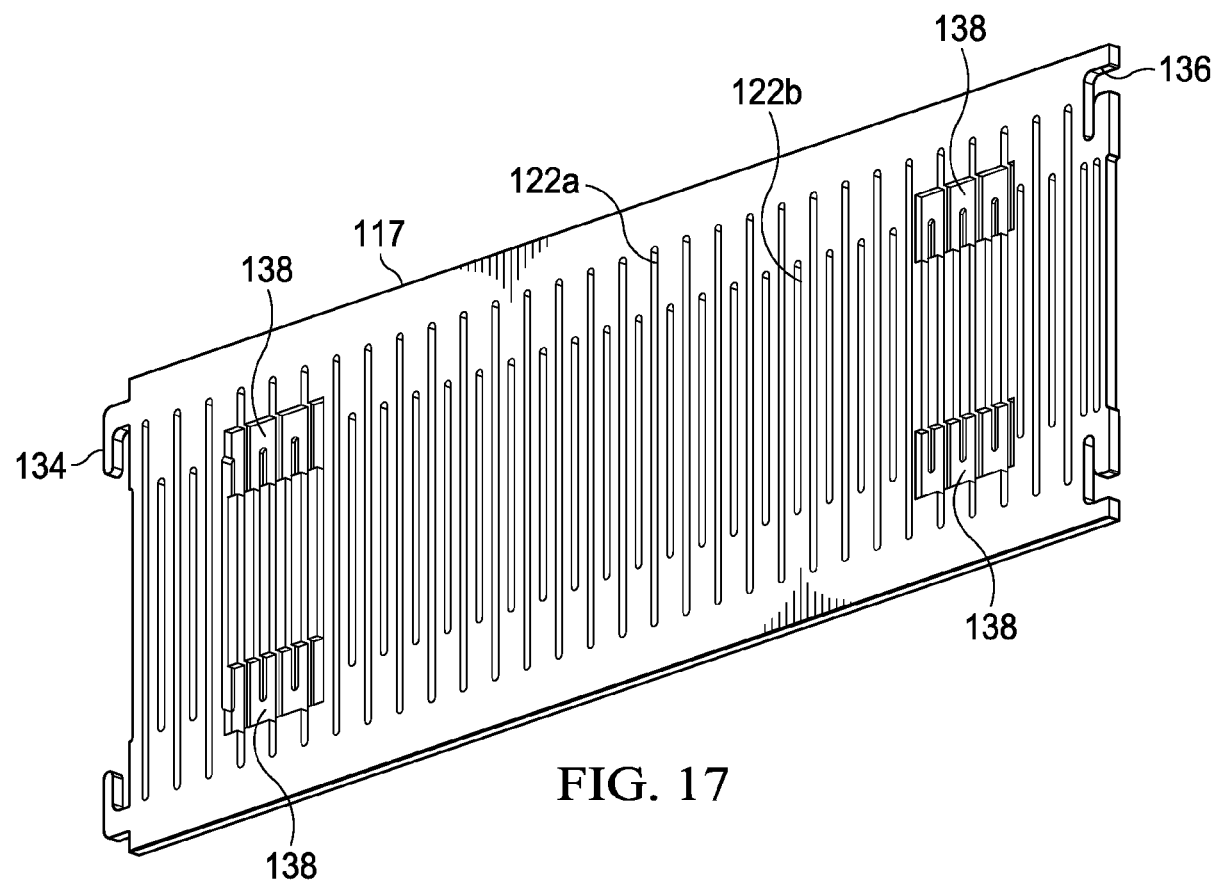
FIG. 17 is an illustration of a perspective view of the backside of the diffuser shown in FIG. 16.
Figure 21:
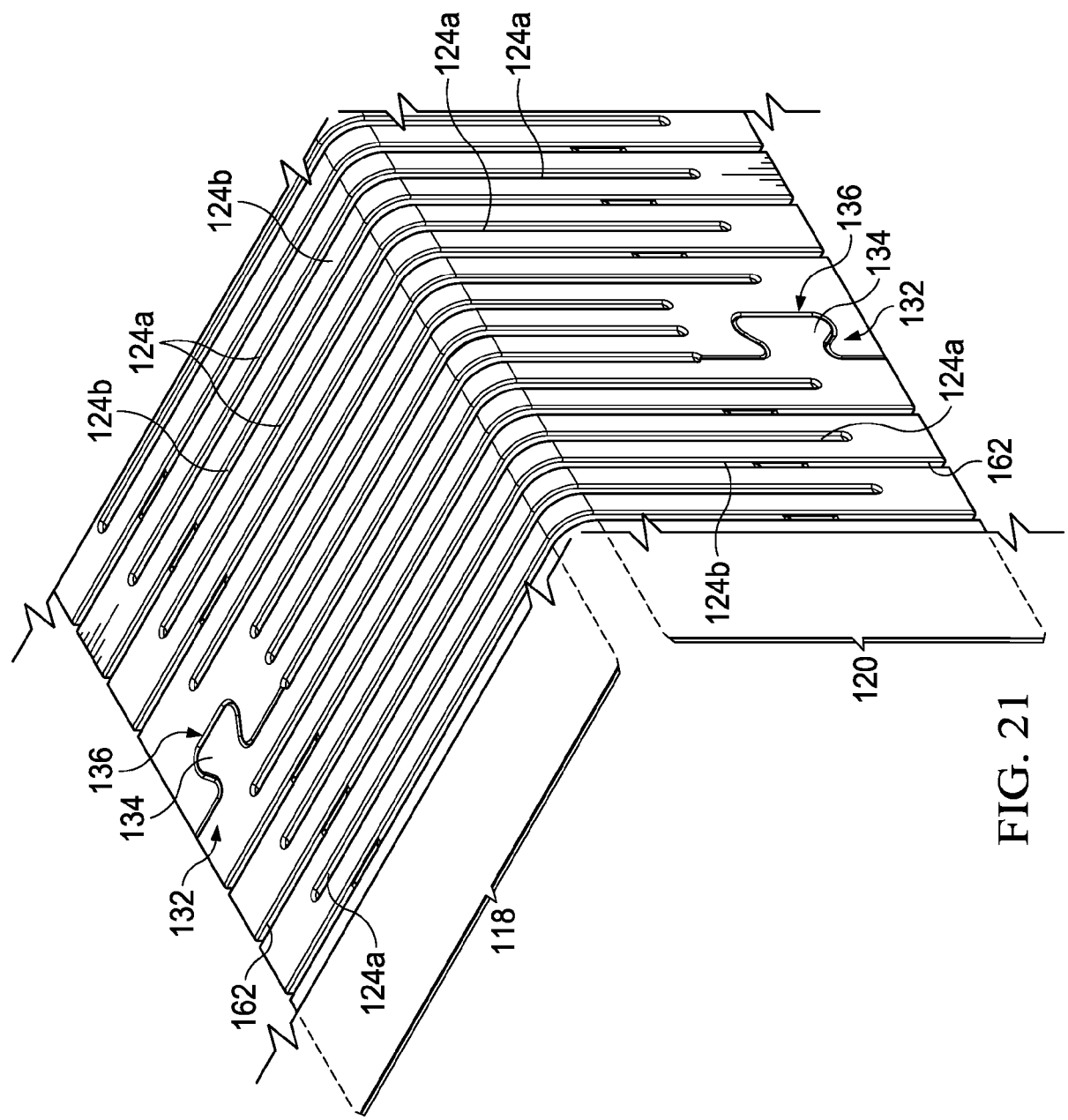
FIG. 21 is an illustration of a fragmentary perspective view of two segments of a diffuser for use with the lower die.
Figure 22:
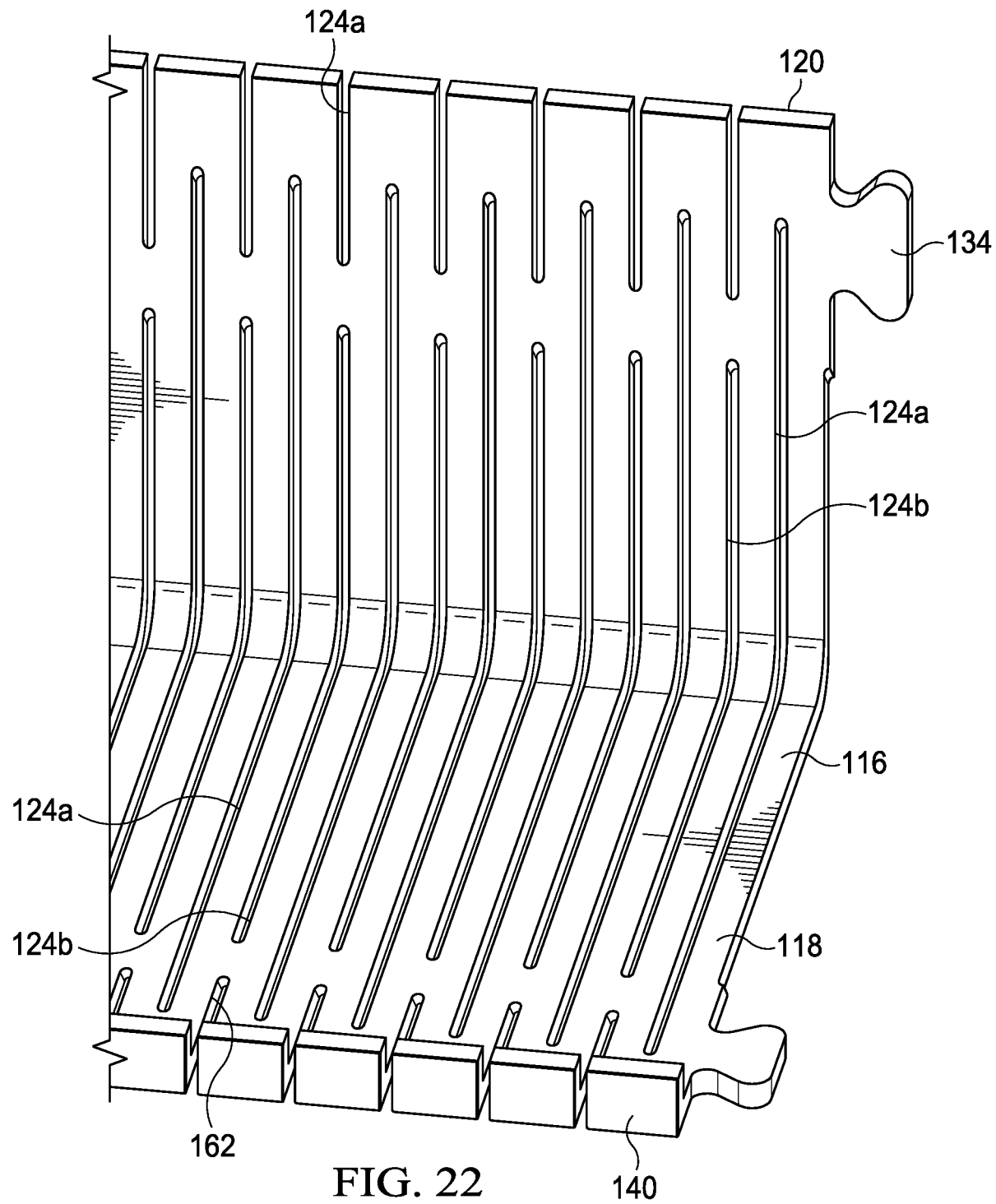
FIG. 22 is an illustration of a fragmentary, perspective view of the backside of the diffuser shown in FIG. 21.

Referring now to FIGS. 15, 21 and 22, each of the lower diffusers 116 comprises multiple diffuser segments 160 mounted on the die blocks 84 and interconnected using interlocks 132, similar to the interlocks 132 described above in connection with the upper diffusers 114. The diffuser segments 160 are formed of a suitable flexible material such as a metal or a composite similar to the upper diffusers 114. Each of the diffuser segments 160 has an L-shaped cross section formed by a flange section 118 overlying the top of the die block 84, and a web section 120 covering a side of the die block 84 within the die cavity 90. As best seen in FIGS. 15 and 22, the flange sections 118 include hooked ends 166 that extend down over the backside 168 (FIG. 15) of the die blocks 84, and function to retain the lower diffusers 116 in proper registration on the die blocks 84. The lower diffusers 116 can be removably or permanently attached to, embedded or otherwise incorporated into the lower die blocks 84. Removable attachment of the upper and lower diffusers 114, 116 to the upper and lower dies 70, 74 allows the diffusers to be interchanged so that differently configured diffusers can be used the same set of dies.

Each of the lower diffusers 116 includes first and second sets of depressions 124a, 124b in the form of slots having two different lengths that are arranged in an alternating configuration similar to the slots in the upper diffusers 114. However, other forms of depressions 124a, 124b in the lower diffusers 116 are possible. The depressions 124a, 124b extend transverse to the longitudinal axis of the lower die 74, across the flange section 118, and down through the web section 120. In the illustrated example, the depressions 124a, 124b in the flange section 118 are aligned with the depressions 122a, 122b, however in other examples these two sets of depressions may be offset from each other. Similarly, the depressions 124a, 124b in the facing web sections 120 of the lower diffusers 116 are aligned with each other in the illustrated example, but in other examples they may be offset from each other.

It should be noted here that in the illustrated examples described above, the depressions 122 are formed in plates or similar members that are attached to the upper and lower dies 70, 74. However, in other examples, the diffusers 114, 116 may comprise depressions 122 that are formed in the tool surfaces of the upper and lower dies 70, 74, as by machining or other techniques.

Figure 23:
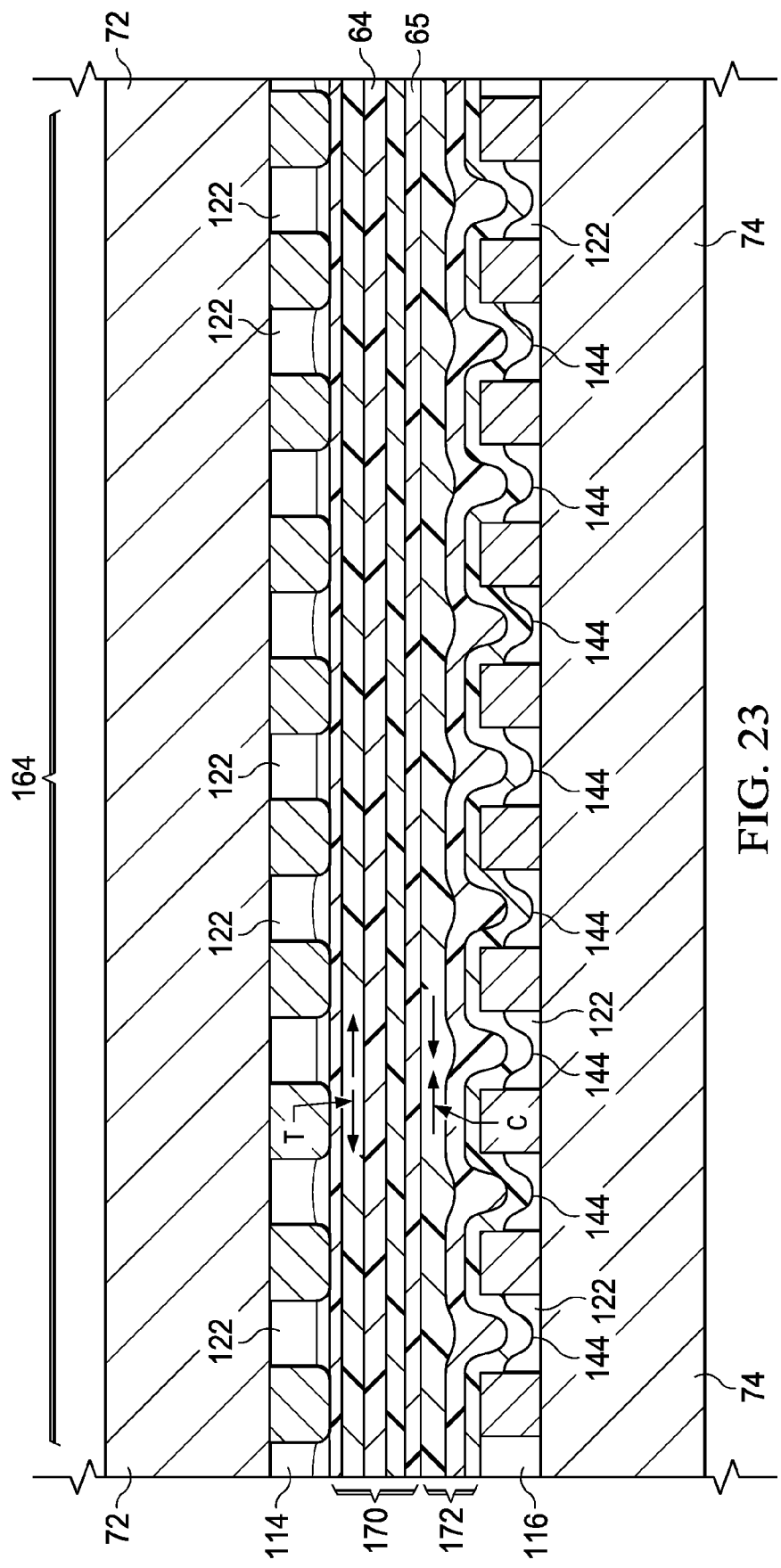
FIG. 23 is an illustration of a sectional view taken along the line 23-23 in FIG. 8.

Attention is now directed to FIG. 23, which illustrates how the upper and lower diffusers 114, 116 diffuse wrinkles in the flange 58 as the stiffener 42 is being contoured along its length. Upon completion of the final step of forming the charge 64 into the desired cross-sectional shape of the stiffener 42 (FIG. 10), the stiffener 42 is formed to the desired contour using the die changing mechanism 101 discussed above in connection with FIG. 6. In the illustrated example, the stiffener 42 is contoured downwardly as shown in FIG. 4. Contouring the stiffener 42 in this manner causes the plies 66 in upper regions 170 of the flange section 118 to be placed in tension T, while those plies 66 in the lower regions 172 are placed in compression C. The depressions 122 in the lower diffuser 116 adjacent the lower regions 172 provide a space into which the fibers and resin of the plies 66 may strain and form diffused wrinkles 144 that have predetermined lengths and depths. Because the depressions 122 in the lower diffuser 116 have a uniform depth and pitch, a series of substantially identical wrinkles 144 are formed within the depressions 122. Effectively, the wrinkling caused by the compressive forces C is diffused, and uncontrolled formation of potentially undesirable wrinkles is avoided.

Referring to both FIGS. 3 and 23, although not shown in the Figures, if the stiffener 42 shown in FIG. 3 is contoured upwardly rather than downwardly, compressive stresses would be generated in the upper region 170, causing the plies 66 in this region to strain into the depressions 122 in the upper diffuser 114. The exact location in the stiffener where compressive stresses may be generated will depend upon the location and direction of the contouring. Ply wrinkling in stiffeners 42 having compound curvatures or contours (those occurring in both the XY and XZ planes) can be mitigated using wrinkle diffusers that are specifically configured to address the localized stresses caused by these types of contours.

Figure 24:
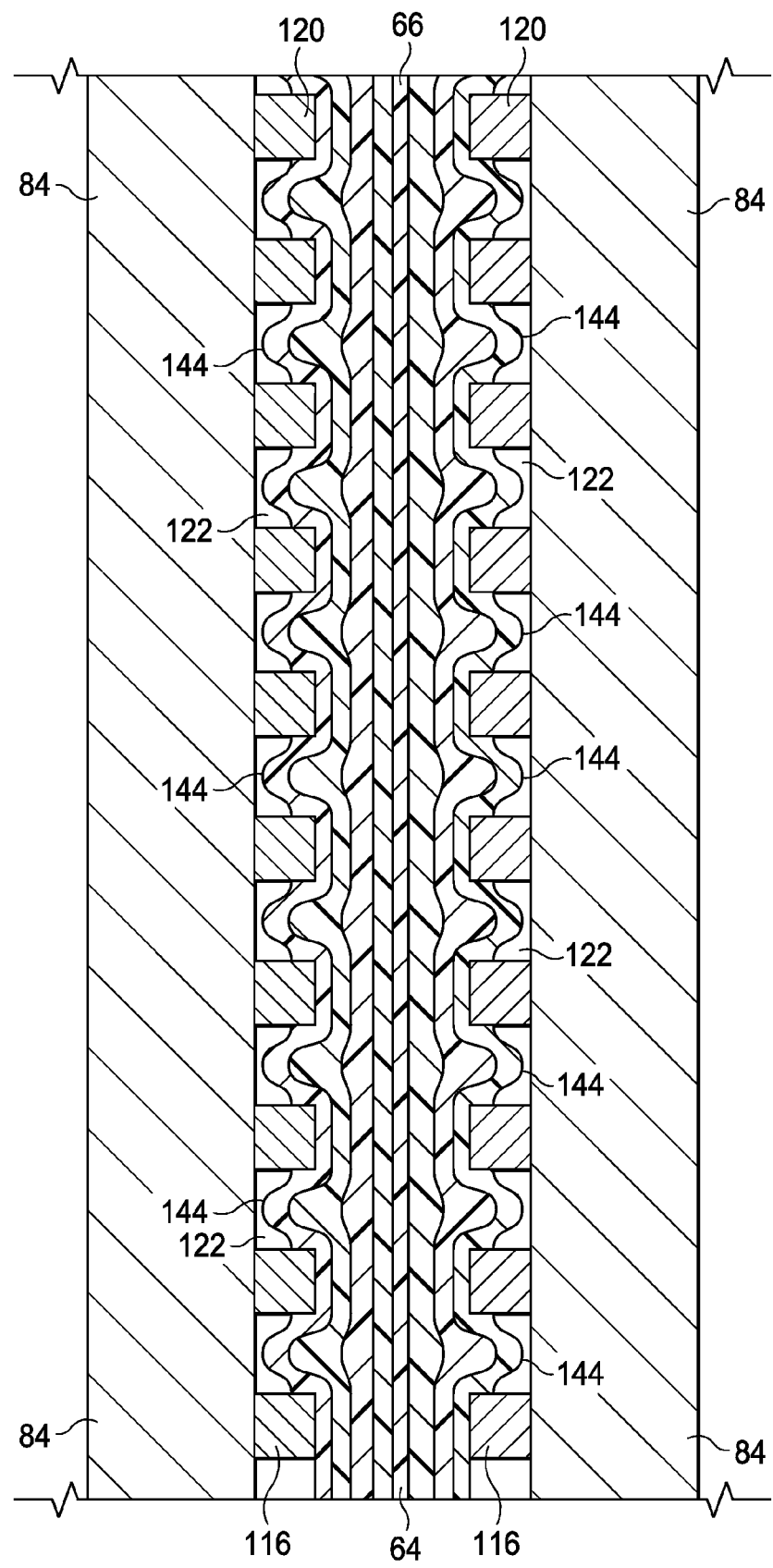
FIG. 24 is an illustration is a sectional view taken along the line 24-24 in FIG. 10.

FIG. 24 illustrates how the lower diffusers 116 diffuse wrinkles in the web 56 of the charge 64 as the stiffener 42 is being contoured along its length. During contouring of the stiffener 42 into the downwardly concave shape shown in FIG. 4, the upper region 174 of the web 56 is in tension while the lower region 176 is in compression. The sectional view shown in FIG. 23 is taken through the lower region 176. The compressive forces present in the lower region 176 create compressive stresses in the plies 66, which causes the plies 66 on each side of the web 56 strain into the depressions 122, thereby forming wrinkles 144 having predetermined and uniform length-to-depth ratios. Similar to the wrinkle diffusion that occurs in the flange 58, wrinkling caused by the compressive stresses in the lower region 176 of the web 56 is diffused, and formation of larger undesirable wrinkles is avoided. In the event that the stiffener 42 shown in FIG. 4 is contoured upwardly rather than downwardly, the compressive forces would be generated in the upper region 174, causing the outer plies 66 in this region to strain into the depressions 122 in the upper region 174 of the lower diffusers 116.

Figure 25:
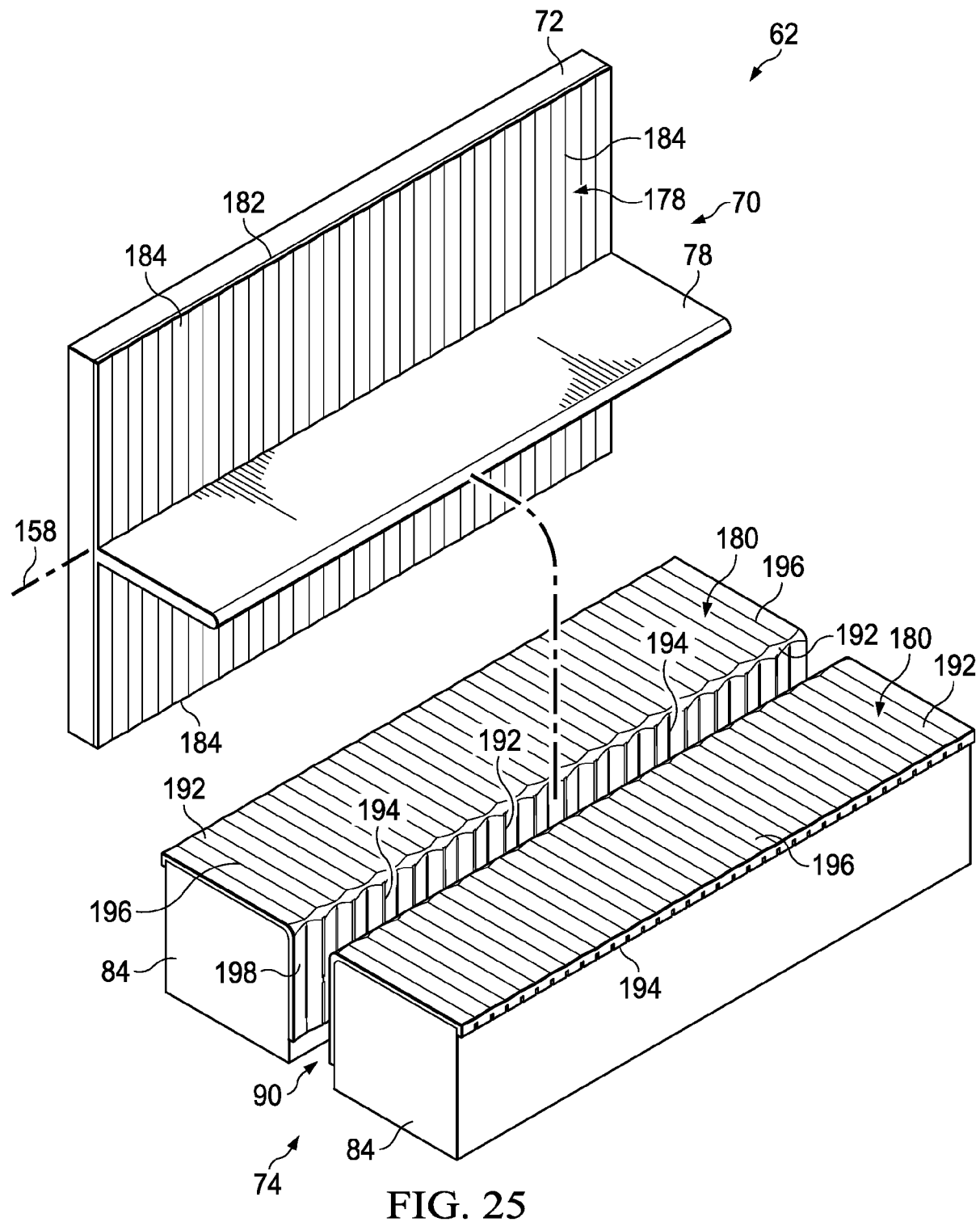
FIG. 25 is an illustration of a perspective view of the tooling of FIG. 5, showing another example of diffusers installed on the dies for reducing ply wrinkling during forming of a stringer to a contour.

Attention is now directed to FIG. 25, which illustrate another example of diffusers installed on the tooling 62. A pair of first diffusers 178, sometimes referred to herein as upper diffusers 178 are installed on the upper plate 72, on opposite sides of the punch 78. A pair of second diffusers 180, also referred to as lower diffusers 180, are respectively installed on the die blocks 84 of the lower die 74. Each of the upper diffusers 178 comprises a diffuser plate 182 removably attached to the upper plate 72 by any suitable means, such as by magnets or fasteners (both not shown), similar to the upper diffusers 114 described in connection with FIG. 15. As will be described below in more detail, each of the upper and lower diffusers 178, 180 have features that diffuse wrinkles formed in the stiffener 42 as it is being contoured.

Figure 26:
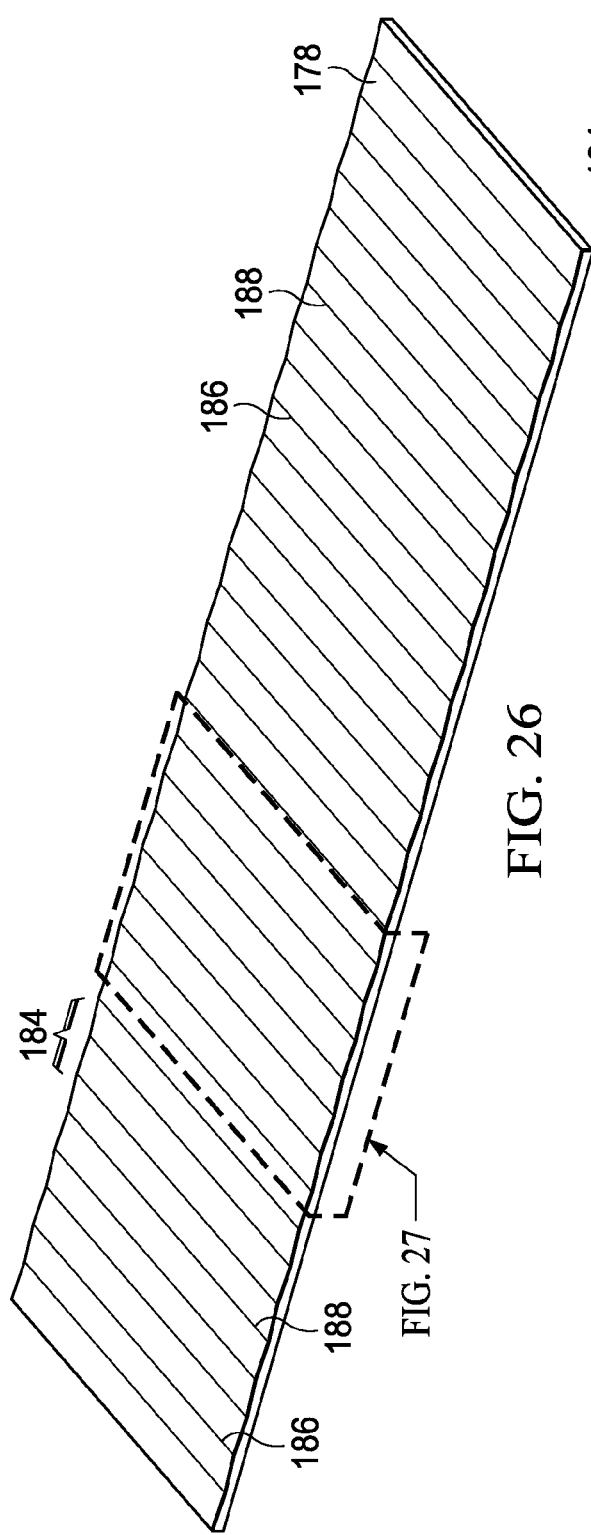
FIG. 26 is an illustration of a perspective view of the front side of one of the diffusers shown in FIG. 25.
Figure 27:
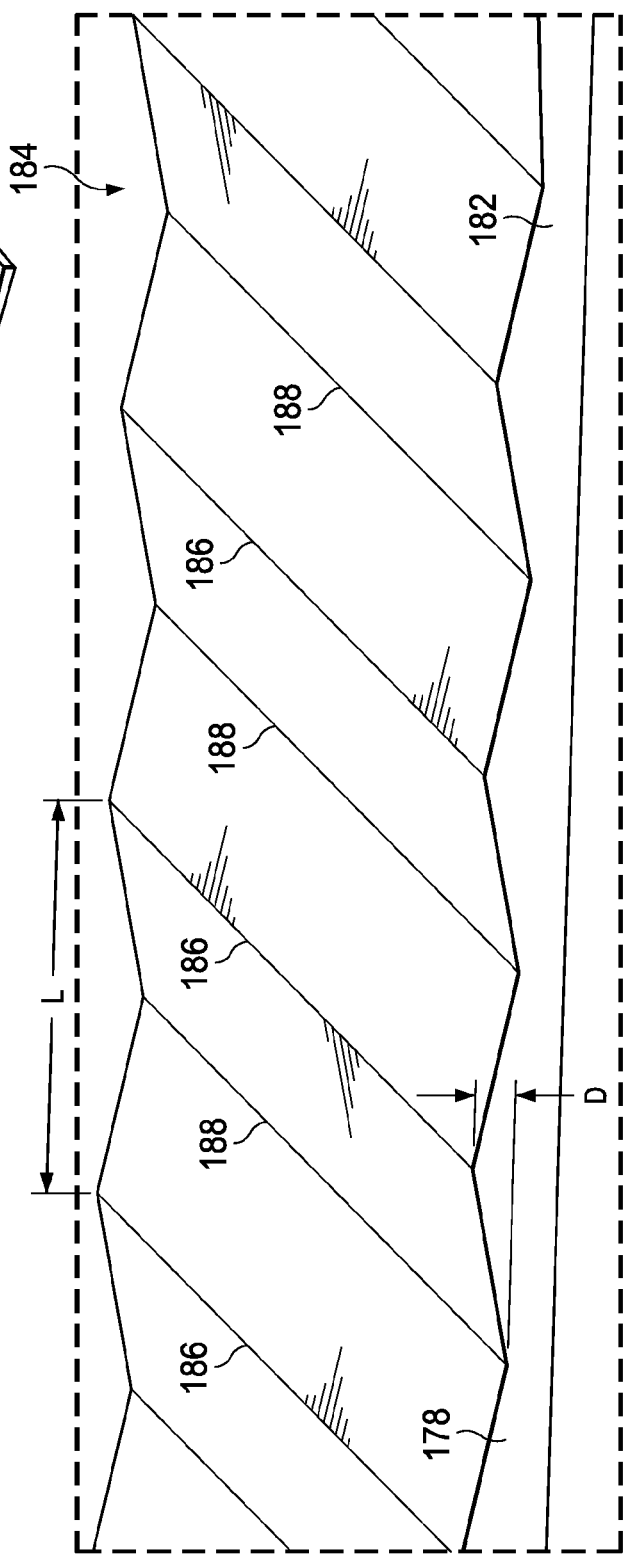
FIG. 27 is an illustration of fragmentary, perspective view of the area designated as '27' in FIG. 26.

Referring to FIGS. 25, 26 and 27, each of the upper diffusers 178 includes a plurality of groove-like depressions 184 therein which, in the illustrated example, extend parallel to each other and transverse to the longitudinal axis of the upper die 70. In other examples, however, the depressions 184 may extend at an angle upper die 70, and may not be parallel to each other, depending upon local out-of-plane conditions in the stiffener 42. Each of the depressions 194 comprises alternating peaks 186 and troughs 188 forming a serpentine pattern when viewed in cross section. As best seen in FIG. 27, the depressions 194 are formed by flat surfaces in the plate 182, however, in other examples these surfaces may be curved to form a smooth wave having a preselected length L (wavelength) and depth D, similar to the depressions 122 previously discussed in connection with the example shown in FIGS. 15-22. The length L, depth D, and frequency may very along the length of the upper diffuser 178.

FIGS. 28 and 29 illustrate additional details of the lower diffusers 180. Each of the lower diffusers 180 is L-shaped in cross-section, and includes a flange section 196 and a web section 198. The flange section 196 includes a second set of depressions 192 that are substantially identical to the first depressions 184 in the upper diffuser 178. The web section 198 of the lower diffuser 180 includes groove-like second depressions 192 substantially identical in cross-sectional shape to the depressions 192 in the flange section 196. In the illustrated embodiment the depressions 192 in the flange section 196 and web section 198 are aligned with each other, however, in other examples, they may be offset from each other. Optionally, the web section 198 may include slots 190 or similar openings that are located at the peaks and troughs 188 of the depressions 184. The depressions 184, 192 as well as the slots 190 can be formed directly in the tool surfaces of the die blocks 84, rather than in members that are attached to the die blocks 84.

Figure 30:
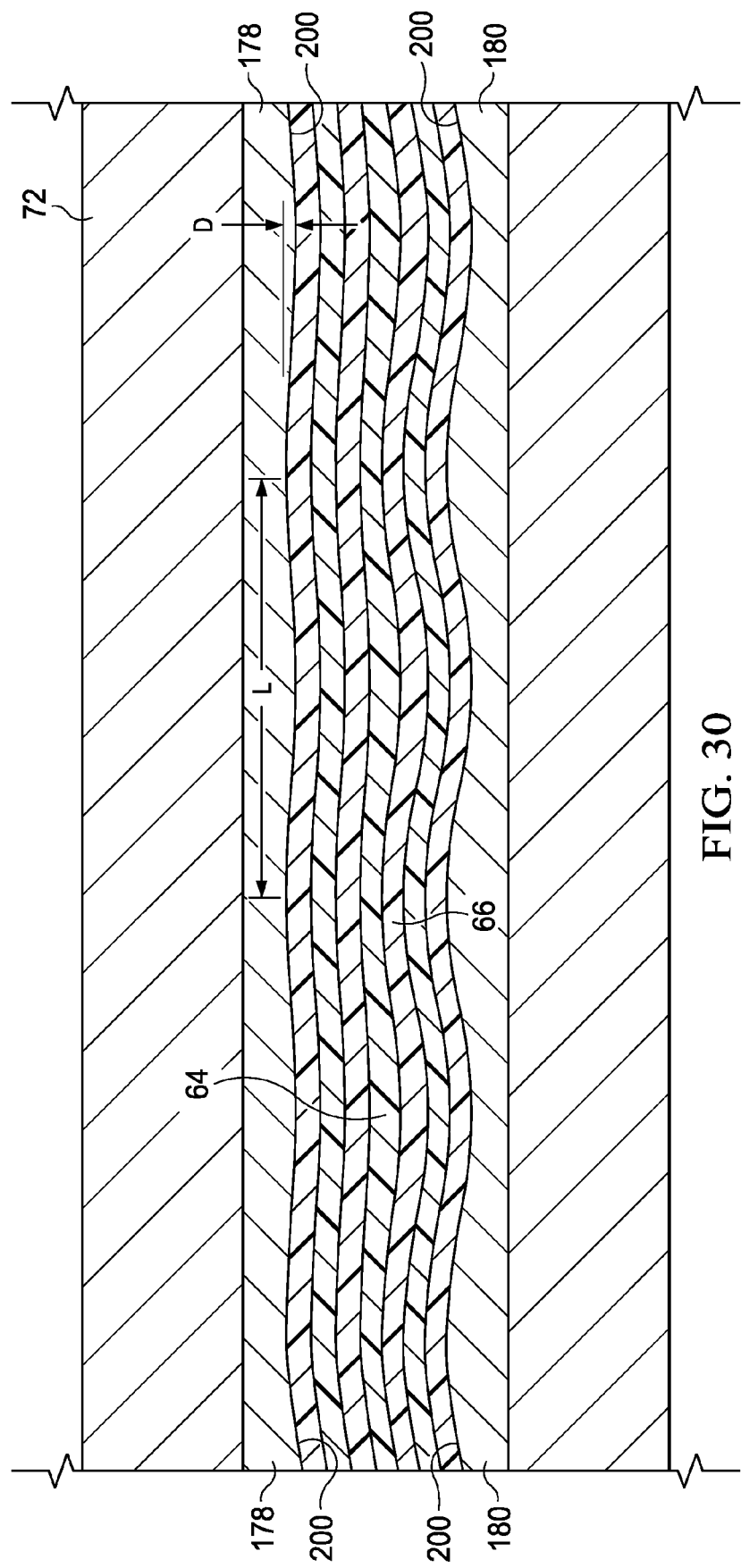
FIG. 30 is an illustration similar to FIG. 23, but showing a sine wave pattern of wrinkles formed in the flange portion of the charge by the diffusers of FIGS. 25-29.

FIG. 30 illustrates the web portion of the charge 64 being compressed between the opposing, wave shaped surfaces 200 of the upper and lower diffusers 178, 180, resulting in a sine wave pattern having a desired length L and depth D.

Figure 31:
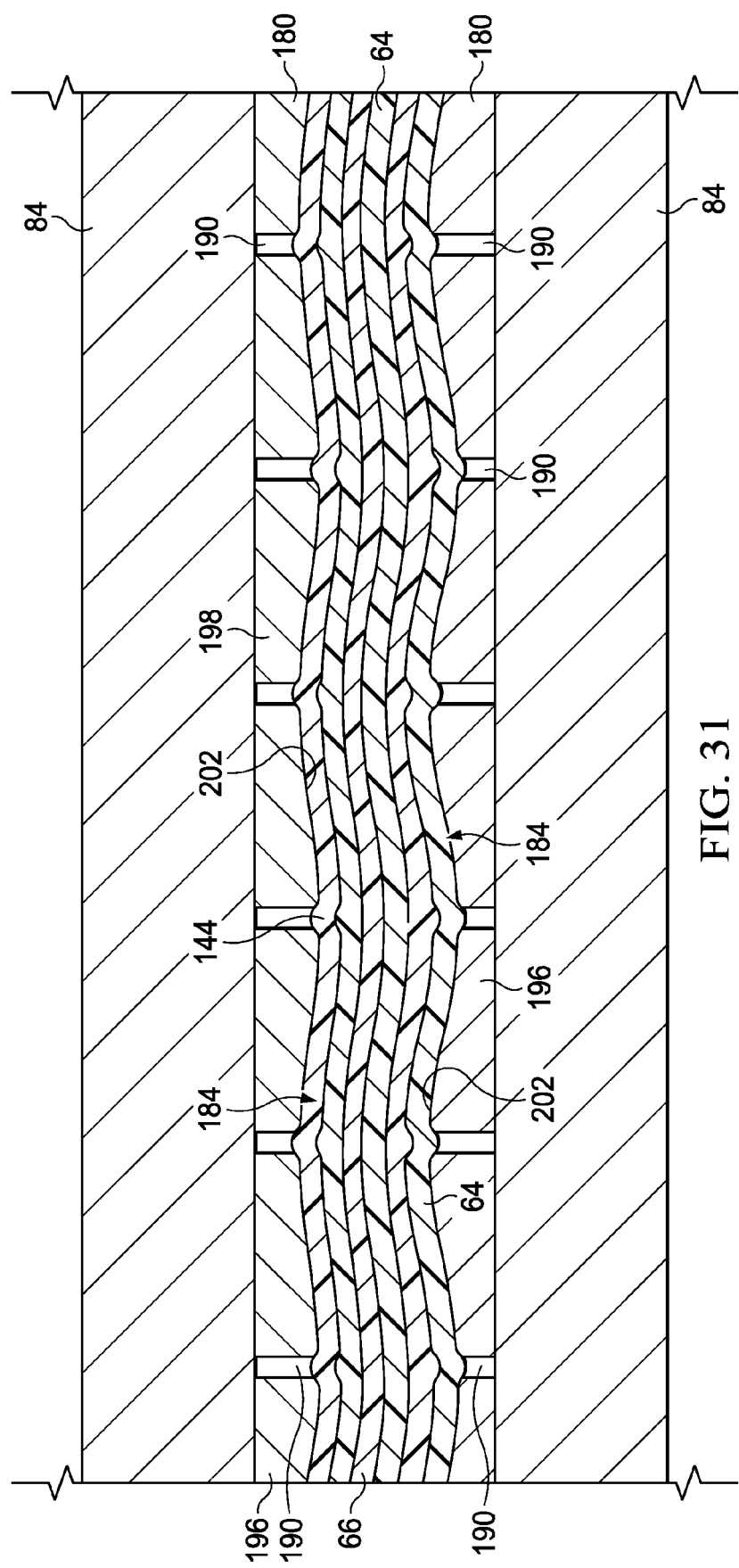
FIG. 31 is an illustration similar to FIG. 30 but showing the sine wave pattern of wrinkles formed in the web portion of the charge.

FIG. 31 shows how the opposing wave shaped surfaces 202 of the opposing web sections 198 form the web section of the charge 64 into a sine wave pattern having a desired length L and depth D. Additionally, the slots 190 provide additional space in the diffusers 180 into which the charge 64 may strain, while providing the diffusers 180 with additional flexibility to better allow them to be contoured by the die changing mechanism 101.

Figure 32:
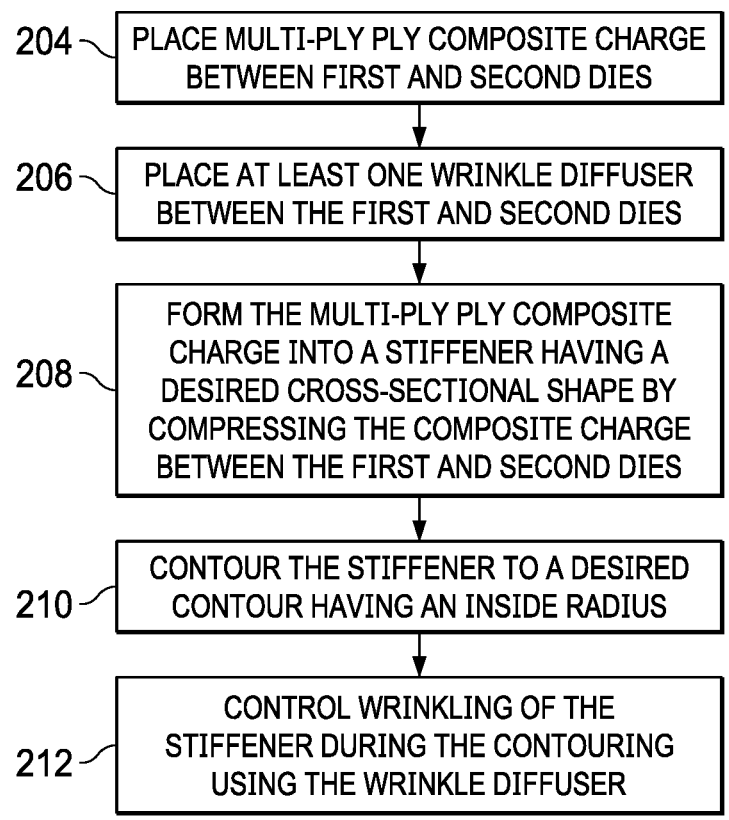
FIG. 32 is an illustration of a flow diagram of a method of making contoured composite laminate stiffeners with reduced wrinkling.

FIG. 32 broadly illustrates the steps of a method of making a contoured composite laminate stiffener. Beginning at 204, a multi-ply composite charge 64 is placed between first and second dies 70, 74. At 206, at least one wrinkle diffuser 114 is placed between the first and second dies 70, 74. At 208, the multi-ply composite charge 64 is formed into a stiffener 42 having a desired cross-sectional shape by compressing the composite charge 64 between the first and second dies 70, 74. At 210, the stiffener 42 is contoured to a desired contour 60 having an inside radius 59. At 212, wrinkling of the stiffener 42 is controlled during the contouring using the wrinkle diffusers 114.

Figure 33:
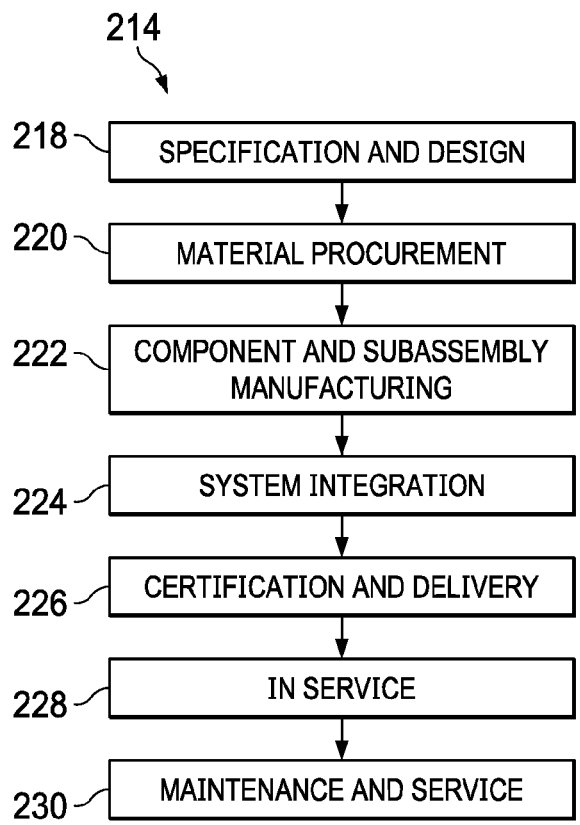
FIG. 33 is an illustration of a flow diagram of aircraft production and service methodology.
Figure 34:
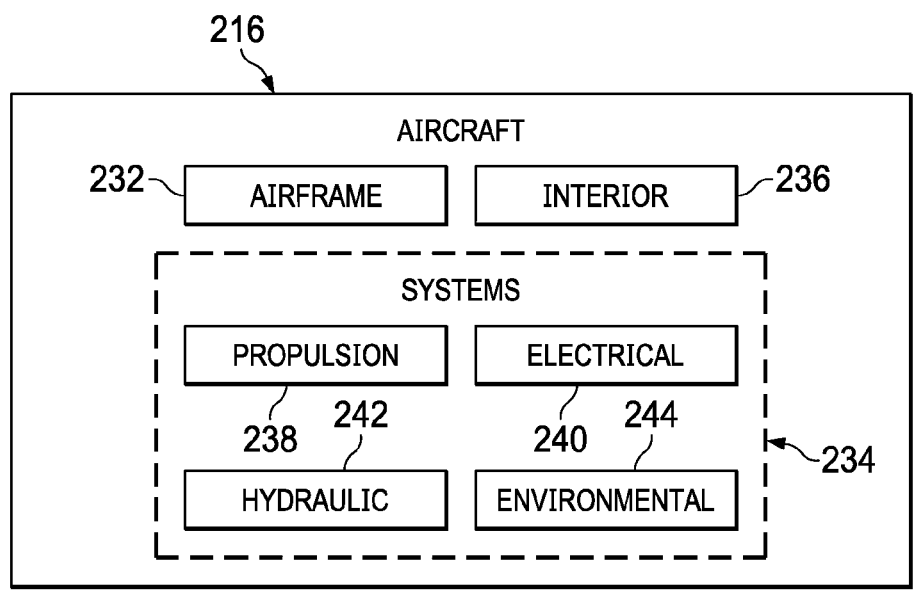
FIG. 34 is an illustration of a block diagram of an aircraft.

Examples of the disclosure may find use in a variety of potential applications, particularly in the transportation industry, including for example, aerospace, marine, automotive applications and other application where contoured stiffeners such as stringers in aircraft, may be used. Thus, referring now to FIGS. 33 and 34, examples of the disclosure may be used in the context of an aircraft manufacturing and service method 214 as shown in FIG. 33 and an aircraft 216 as shown in FIG. 34. Aircraft applications of the disclosed examples may include a variety of the elongate stiffeners such as stringers that have contours, curvatures, varying thicknesses or other out-of-plane features along their lengths. During pre-production, exemplary method 214 may include specification and design 218 of the aircraft 216 and material procurement 220. During production, component and subassembly manufacturing 222 and system integration 224 of the aircraft 216 takes place. Thereafter, the aircraft 216 may go through certification and delivery 226 in order to be placed in service 228. While in service by a customer, the aircraft 216 is scheduled for routine maintenance and service 230, which may also include modification, reconfiguration, refurbishment, and so on.

Each of the processes of method 214 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 34, the aircraft 216 produced by exemplary method 214 may include an airframe 232 with a plurality of systems 234 and an interior 236. Examples of high-level systems 234 include one or more of a propulsion system 238, an electrical system 240, a hydraulic system 242 and an environmental system 244. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 214. For example, components or subassemblies corresponding to production process 222 may be fabricated or manufactured in a manner similar to components or subassemblies produced while the aircraft 216 is in service. Also, one or more apparatus examples, method examples, or a combination thereof may be utilized during the production processes 222 and 224, for example, by substantially expediting assembly of or reducing the cost of an aircraft 216. Similarly, one or more of apparatus examples, method examples, or a combination thereof may be utilized while the aircraft 216 is in service, for example and without limitation, to maintenance and service 230.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. Apparatus for forming a contoured composite laminate stiffener, comprising:
   a first die and a second die between which a multi-ply composite charge may be formed into a stiffener, the first die and the second die being configured to form a contour in the stiffener; and
   at least a first diffuser positioned between the first die and the second die, and configured to diffuse wrinkles in the stiffener along the contour;
   wherein the first diffuser includes depressions therein into which the plies of the multi-ply charge may strain in response to compressive stress in the stiffener caused by forming the stiffener to the contour, and wherein the depressions form a plurality of peaks and troughs forming a serpentine pattern or a sine wave pattern.

2. The apparatus of claim 1, wherein the depressions include a plurality of slots spaced apart from each other.

3. The apparatus of claim 1, wherein:
   the first diffuser is located at an inside radius of the contour of the stiffener in which compressive stresses are generated in the stiffener when the stiffener is formed to the contour, and
   the depressions configured to allow portions of the multi-ply charge at the inside radius to strain into the depressions and form wrinkles having a predetermined length-to-depth ratio.

4. The apparatus of claim 1, wherein:
   the first diffuser is a plate having the depressions therein into which portions of the plies of the multi-ply charge in the contour may strain when the stiffener is formed to the contour, and
   the plate is removably attached to one of the first die and the second dies.

5. The apparatus of claim 1, further comprising:
at least a second diffuser positioned between the first die and the second die and opposing the first diffuser, the second diffuser including depressions therein configured to diffuse wrinkling of the plies of the multi-ply charge within the contour in the stiffener.

6. Apparatus for making a contoured composite laminate stringer having a flange and a web, comprising:
a first die and a second die between which a multi-ply composite charge may be formed into a flange and a web having a contour;
a first wrinkle diffuser on the first die; and
a second wrinkle diffuser on the second die and opposing the first wrinkle diffuser;
wherein the first and second wrinkle diffusers are configured to diffuse wrinkles in the contour of the flange and the web as the multi-ply composite charge is being formed;
wherein each of the first wrinkle diffuser and the second wrinkle diffuser includes a plurality of depressions therein into which the multi-ply composite charge may strain within the contour as the multi-ply composite charge is being formed to the contour, and wherein the depressions in the first wrinkle diffuser are aligned with and oppose the depressions in the second wrinkle diffuser.

7. The apparatus of claim 6, wherein the depressions form a plurality of peaks and troughs forming a sine wave pattern.

8. The apparatus of claim 6, wherein the depressions include a plurality of slots spaced apart from each other.

9. The apparatus of claim 8, wherein:
the slots include a set of first slots each having a length, and a set of second slots each having a length less than the length of the first slots, and
the first slots and the second slots are arranged in alternating relationship to each other.

10. The apparatus of claim 6, wherein:
each of the first wrinkle diffuser and the second wrinkle diffuser includes a plate attached to a corresponding one of the first die and the second die, and
the depressions are formed in each plate.

11. The apparatus of claim 6, wherein:
each of the first wrinkle diffuser and the second wrinkle diffuser includes a plurality of plates,
the depressions are located in the plates, and
the plates are releasably connected with each other.

12. A method of making a contoured composite laminate stiffener, comprising:
placing a multi-ply composite charge between first and second dies;
placing at least one wrinkle diffuser between the first and second dies;
forming the multi-ply composite charge into a stiffener having a desired cross sectional shape by compressing the multi-ply composite charge between the first and second dies;
contouring the stiffener to a desired contour having an inside radius; and
controlling wrinkling of the stiffener along the inside radius during the contouring using the wrinkle diffuser;
wherein the wrinkle diffuser includes depressions therein into which the plies of the multi-ply charge may strain in response to compressive stress in the stiffener caused by forming the stiffener to the desired contour, and wherein the depressions form a plurality of peaks and troughs forming a serpentine pattern or a sine wave pattern.

13. The method of claim 12, wherein:
the contouring includes contouring the first and second dies, and
placing the wrinkle diffuser includes installing the wrinkle diffuser on one of the first and second dies in an area along the inside radius.

14. The method of claim 12, wherein controlling the wrinkling includes forming wrinkles in the multi-ply composite charge having preselected length-to-depth ratios.

15. The method of claim 12, wherein placing the wrinkle diffuser includes:
interconnecting a plurality of diffuser plates together, and
removably attaching the plurality of diffuser plates to at least one of the first and second dies.

16. The method of claim 12, wherein controlling wrinkling includes forcing the multi-ply composite charge into the depressions in the wrinkle diffuser.

17. Apparatus for making a contoured composite laminate stringer having a flange and a web, comprising:
a first die and a second die between which a multi-ply composite charge may be formed into a flange and a web having a contour;
a first wrinkle diffuser on the first die; and
a second wrinkle diffuser on the second die and opposing the first wrinkle diffuser;
wherein the first and second wrinkle diffusers are configured to diffuse wrinkles in the contour of the flange and the web as the multi-ply composite charge is being formed;
wherein each of the first wrinkle diffuser and the second wrinkle diffuser includes a plurality of depressions therein into which the multi-ply composite charge may strain within the contour as the multi-ply composite charge is being formed to the contour; and
wherein each of the first wrinkle diffuser and the second wrinkle diffuser includes a plurality of plates, the depressions are located in the plates, and the plates are releasably connected with each other.

18. The apparatus of claim 17, wherein the depressions form a plurality of peaks and troughs forming a serpentine pattern.

19. The apparatus of claim 17, wherein the depressions form a plurality of peaks and troughs forming a sine wave pattern.

20. The apparatus of claim 17, wherein the depressions include a plurality of slots spaced apart from each other.

* * * * *